(12) United States Patent
Yoshimura et al.

(10) Patent No.: US 12,707,438 B2
(45) Date of Patent: Aug. 11, 2026

(54) TERMINAL APPARATUS, BASE STATION APPARATUS, AND COMMUNICATION METHOD FOR REPEATED TRANSMISSIONS OF PUSCH IN A PARTICULAR SUB-DURATION

(71) Applicant: SHARP KABUSHIKI KAISHA, Sakai City (JP)

(72) Inventors: Tomoki Yoshimura, Sakai City (JP); Shoichi Suzuki, Sakai City (JP); Toshizo Nogami, Sakai City (JP); Daiichiro Nakashima, Sakai City (JP); Wataru Ouchi, Sakai City (JP); Huifa Lin, Sakai City (JP); Takahisa Fukui, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 305 days.

(21) Appl. No.: 18/271,313

(22) PCT Filed: Jan. 11, 2022

(86) PCT No.: PCT/JP2022/000495

§ 371 (c)(1),
(2) Date: Jul. 7, 2023

(87) PCT Pub. No.: WO2022/153966

PCT Pub. Date: Jul. 21, 2022

(65) Prior Publication Data

US 2024/0306128 A1 Sep. 12, 2024

(30) Foreign Application Priority Data

Jan. 13, 2021 (JP) ................................ 2021-003157

(51) Int. Cl.

| | |
|---|---|
| ***H04W 72/04*** | (2023.01) |
| ***H04L 5/00*** | (2006.01) |
| ***H04W 72/0446*** | (2023.01) |
| ***H04W 72/1268*** | (2023.01) |
| ***H04W 72/231*** | (2023.01) |

(52) U.S. Cl.

CPC ....... *H04W 72/0446* (2013.01); *H04L 5/0051* (2013.01); *H04W 72/1268* (2013.01); *H04W 72/231* (2023.01)

(58) Field of Classification Search

CPC ........... H04W 72/231; H04W 72/0446; H04W 72/1268; H04W 72/23; H04W 72/044;

(Continued)

(56) References Cited

U.S. PATENT DOCUMENTS

2013/0294318 A1* 11/2013 Amerga .................. H04W 4/06 370/312
2018/0279327 A1* 9/2018 Ying ................. H04W 72/0446

(Continued)

OTHER PUBLICATIONS

NTT DOCOMO, "New SID Proposal: Study on New Radio Access Technology", RP-160671, 3GPP TSG RAN Meeting #71, Göteborg, Sweden, Mar. 7-10, 2016.

(Continued)

*Primary Examiner* — Wei Zhao
(74) *Attorney, Agent, or Firm* — ScienBiziP, P.C.

(57) ABSTRACT

A terminal apparatus includes a determination circuitry that divides a certain duration having a length provided by a higher layer parameter into one or more sub-durations based at least on a downlink region; and a transmission circuitry that performs repeated transmissions for a PUSCH in a certain sub-duration among the one or more sub-durations. Phase continuity is maintained for the repeated transmissions for the PUSCH.

3 Claims, 16 Drawing Sheets

(58) Field of Classification Search
CPC ... H04L 5/0051; H04L 5/0048; H04L 5/0096; H04L 5/0044; H04L 5/005
See application file for complete search history.

(56) References Cited

U.S. PATENT DOCUMENTS

2022/0182194 A1* 6/2022 Lorca Hernando ... H04L 5/1469
2023/0291523 A1* 9/2023 Hasegawa ............ H04L 5/0094

OTHER PUBLICATIONS

RAN Chairman et al., "Release 17 package for RAN", RP-193216, 3GPP TSG RAN Meeting #86, Sitges, Spain, Dec. 9-12, 2019.

Panasonic, "Discussion on PUSCH coverage enhancements", R1-2008378, 3GPP TSG RAN WG1 #103-e, e-Meeting, Oct. 26-Nov. 13, 2020.

Zte, "Remaining Issues for transmission in preconfigured UL resources for NB-IoT", R1-2001851 , 3GPP TSG RAN WG1 Meeting #100bis , e-Meeting, Apr. 20-30, 2020.

Moderator (China Telecom), "[103-e-NR-CovEnh-04] Summary of email discussion on PUSCH coverage enhancements", R1-2009814, 3GPP TSG RAN WG1 Meeting #103-e, E-meeting, Oct. 26, 2020-Nov. 13, 2020, Nov. 19, 2020.

Moderator (China Telecom), "FL summary of PUSCH coverage enhancements", R1-2009320, 3GPP TSG RAN WG1 Meeting #103-e, E-meeting, Oct. 26, 2020-Nov. 13, 2020, Nov. 1, 2020.

Nokia Networks, "PUSCH Transmission for MTC", R1-156644, 3GPP TSG-RAN WG1 Meeting #83, Anaheim, USA, Nov. 15, 2015-Nov. 22, 2015, Nov. 15, 2015.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

REEs for PSS

REs for SSS

REs for PBCH

Frequency

Time (OFDM symbol index $l_{sym}$)

FIG. 7

$N^{RB}_{sc}$ subcarriers

Allocated VRBs $N^{RB}_{sc}$ subcarriers

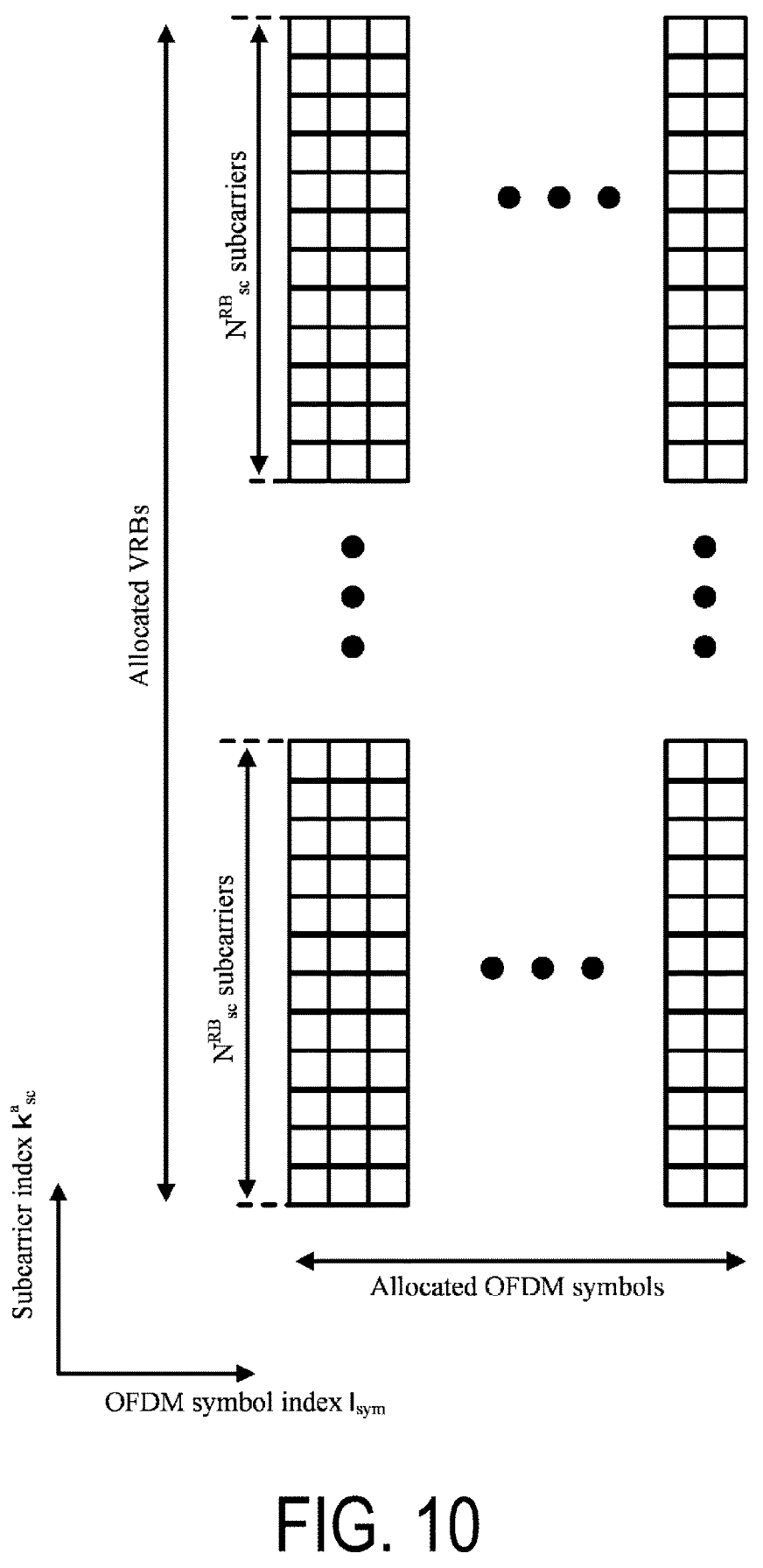

Subcarrier index $k^{a}_{sc}$

Allocated OFDM symbols

OFDM symbol index $l_{sym}$

FIG. 10

TERMINAL APPARATUS, BASE STATION APPARATUS, AND COMMUNICATION METHOD FOR REPEATED TRANSMISSIONS OF PUSCH IN A PARTICULAR SUB-DURATION

TECHNICAL FIELD

The present invention relates to a terminal apparatus, a base station apparatus, and a communication method.

This application claims priority to JP 2021-003157 filed on Jan. 13, 2021, the contents of which are incorporated herein by reference.

BACKGROUND ART

In the 3$^{rd}$ Generation Partnership Project (3GPP), a radio access method and a radio network for cellular mobile communications (hereinafter also referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as a User Equipment (UE). LTE is a cellular communication system in which multiple areas covered by base station apparatuses are arranged in a form of cells. A single base station apparatus may manage multiple serving cells.

The 3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is to be satisfy requirements for three scenarios including enhanced Mobile BroadBand (eMBB), massive Machine Type Communication (mMTC), and Ultra Reliable and Low Latency Communication (URLLC) in a single technology framework.

Study on enhancement of functions of cellular mobile communication, such as NR, is expected. For example, as described in NPL 2, study related to enhancement of functions of NR is under way.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

NPL 2: "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

SUMMARY OF INVENTION

Technical Problem

An aspect of the present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus and includes a determination circuitry that divides a certain duration into one or more sub-durations based at least on a downlink region, the certain duration having a length provided by a higher layer parameter; and a transmission circuitry that performs repeated transmissions for a PUSCH in a certain sub-duration among the one or more sub-durations. Phase continuity is maintained for the repeated transmissions for the PUSCH.

(2) A second aspect of the present invention is a base station apparatus and includes a determination circuitry that divides a certain duration into one or more sub-durations based at least on a downlink region, the certain duration having a length provided by a higher layer parameter; and a transmission circuitry that receives repeated transmissions for a PUSCH in a certain sub-duration among the one or more sub-durations. The base station apparatus performs channel estimation on the repeated transmissions for the PUSCH by using a DMRS for each of the repeated transmissions for the PUSCH.

(3) A third aspect of the present invention is a communication method used for a terminal apparatus and includes the steps of dividing a certain duration into one or more sub-durations based at least on a downlink region, the certain duration having a length provided by a higher layer parameter; and performing repeated transmissions for a PUSCH in a certain sub-duration among the one or more sub-durations. Phase continuity is maintained for the repeated transmissions for the PUSCH.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between the subcarrier spacing configuration μ, the number of OFDM symbols per slot $N^{slot}_{symb}$, and a cyclic Prefix (CP) configuration according to an aspect of the present embodiment.

FIG. 7 is a diagram illustrating a configuration example of an SS/PBCH block according to an aspect of the present embodiment.

FIG. 10 is a diagram illustrating an example of symbol mapping to VRB according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a ceiling function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs a maximum value out of J and K. Here, in a case that J and K are equal, max(J, K) is a function that outputs J or K. min(L, M) is a function that outputs a maximum value out of L and M. Here, in a case that L and M are equal, min(L, M) is a function that outputs L or M. round(N) is a function that outputs an integer value of a value closest to N.

Figure 1:
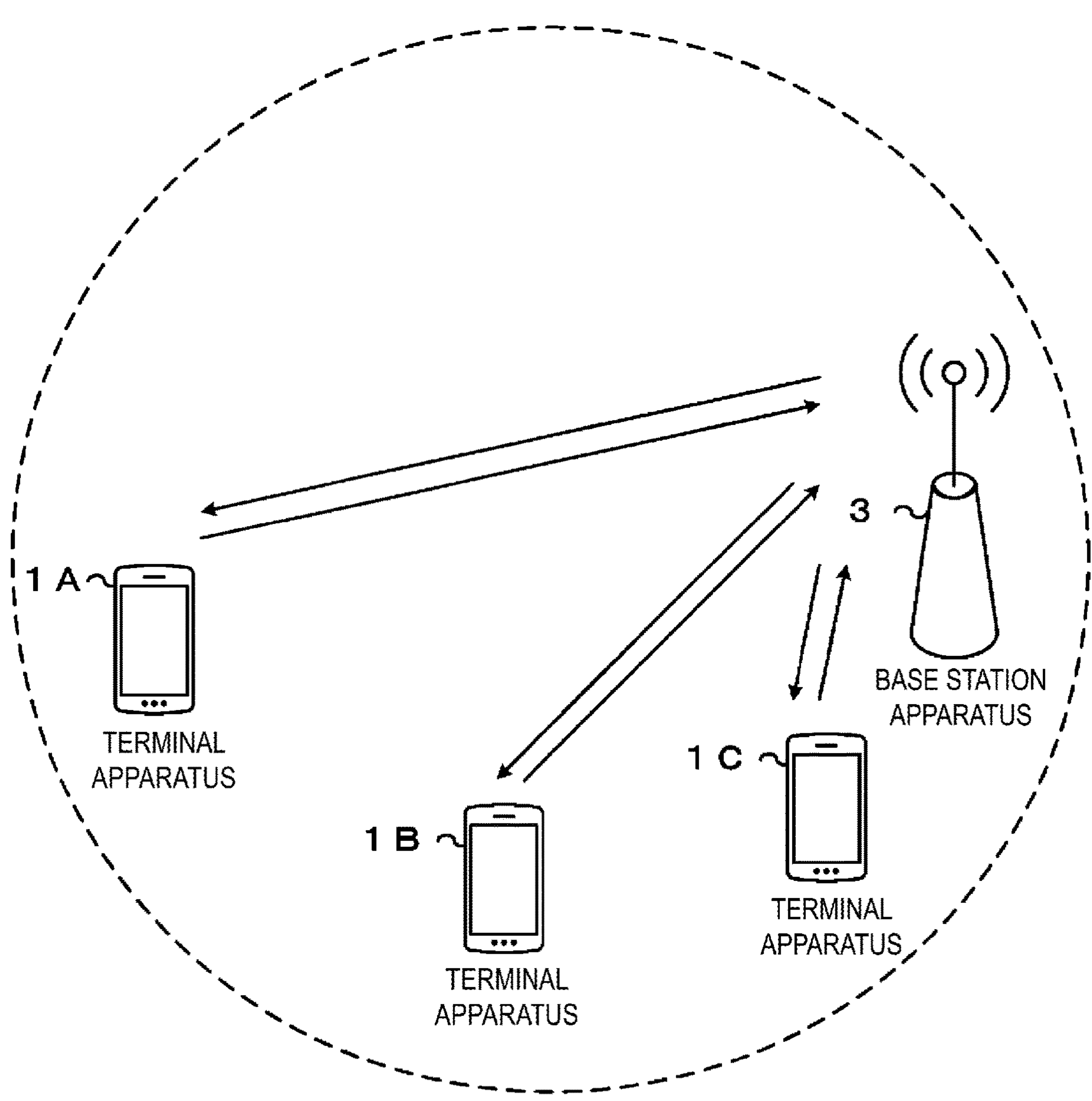
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes at least terminal apparatuses 1A to 1C and a base station apparatus 3 (Base station #3 (BS #3)). As a general term for the terminal apparatuses 1A to 1C, each terminal apparatus that performs communication with the base station apparatus 3 is hereinafter also referred to as a terminal apparatus 1 (User Equipment #1 (UE #1)).

In the radio communication system, at least one communication scheme may be used. The one communication scheme may be Orthogonal Frequency Division Multiplex (OFDM). For example, in the downlink being communication from the base station apparatus 3 to the terminal apparatus 1, Cyclic Prefix-Orthogonal Frequency Division Multiplex (CP-OFDM) may be at least used. In the uplink being communication from the terminal apparatus 1 to the base station apparatus 3, either of CP-OFDM or Discrete Fourier Transform-spread-Orthogonal Frequency Division Multiplex (DFT-s-OFDM) may be at least used. DFT-s-OFDM is a communication scheme in which Transform precoding is applied prior to signal generation in CP-OFDM. Here, transform precoding is also referred to as DFT precoding.

The base station apparatus 3 may include one or more transmission apparatuses (or transmission points, transmission and/or reception apparatuses, transmission and/or reception points). In a case that the base station apparatus 3 includes multiple transmission apparatuses, the multiple transmission apparatuses may be arranged at geographically different positions or may be arranged at the geographically same position. Arranging multiple transmission apparatuses at the geographically same position may mean that the multiple transmission apparatuses are configured as one apparatus.

The base station apparatus 3 may provide one or more serving cells. Each serving cell may be defined as a set of resources used for radio communication. The serving cell is also referred to as a cell.

The serving cell may include at least one downlink component carrier and/or one uplink component carrier. The serving cell may include at least two or more downlink component carriers, and/or two or more uplink component carriers. The downlink component carrier and the uplink component carrier are also referred to as a component carrier.

For example, for one component carrier, one resource grid may be given. For a pair of one component carrier and a certain subcarrier spacing configuration μ, one resource grid may be given. Here, the subcarrier spacing configuration μ is also referred to as numerology. The resource grid includes $N^{size,\mu}_{grid,x}N^{RB}_{sc}$ subcarriers. The resource grid starts from a common resource block $N^{start,\mu}_{grid,x}$. The common resource block $N^{start,\mu}_{grid,x}$ is also referred to as a reference point of the resource grid. The resource grid includes $N^{subframe,\mu}_{symb}$ OFDM symbols. x is a subscript indicating a transmission direction and indicates either of a downlink or an uplink. For a set of a certain antenna port p, a certain subcarrier spacing configuration μ, and a certain transmission direction x, one resource grid is given.

$N^{size,\mu}_{grid,x}$ and $N^{start,\mu}_{grid,x}$ are given based at least on a higher layer parameter (CarrierBandwidth). The higher layer parameter is also referred to as an SCS specific carrier. One resource grid corresponds to one SCS specific carrier. One component carrier may include one or more SCS specific carriers. The SCS specific carrier may be included in system information. For each of the SCS specific carriers, one subcarrier spacing configuration μ may be given.

The SubCarrier Spacing (SCS) Δf may be Δf=2μ·15 kHz. For example, the subcarrier spacing configuration μ may indicate one of 0, 1, 2, 3, or 4.

FIG. 2 is an example illustrating a relationship between the subcarrier spacing configuration μ, the number of OFDM symbols per slot $N^{slot}_{symb}$, and a cyclic Prefix (CP) configuration according to an aspect of the present embodiment. In FIG. 2A, for example, in a case that the subcarrier spacing configuration μ is two and the CP configuration is a normal cyclic prefix (normal CP), $N^{slot}_{symb}=14$, $N^{frame,\mu}_{slot}=40$, and $N^{subframe,\mu}_{slot}=4$. In FIG. 2B, for example, in a case that the subcarrier spacing configuration μ is two and the CP configuration is an extended cyclic prefix (extended CP), $N^{slot}_{symb}=12$, $N^{frame,\mu}_{slot}=40$, and $N^{subframe,\mu}_{slot}=4$.

In the radio communication system according to an aspect of the present embodiment, time unit $T_c$ may be used for expression of the length of the time domain. The time unit $T_c$ is $T_c=1/(\Delta f_{max}\cdot N_f)$. $\Delta f_{max}=480$ kHz. $N_f=4096$. A constant κ is $\kappa=\Delta f_{max}\cdot N_f/(\Delta f_{ref}N_{f,ref})=64$. $\Delta f_{ref}$ is 15 kHz. $N_{f,ref}$ is 2048.

Transmission of a signal in the downlink and/or transmission of a signal in the uplink may be organized into a radio frame (system frame, frame) having the length $T_f$. $T_f=(\Delta f_{max}N_f/100)\cdot T_s=10$ ms. "·" represents multiplication. The radio frame includes 10 subframes. The length $T_{sf}$ of the subframe is $(\Delta f_{max}N_f/1000)\cdot T_s=1$ ms. The number of OFDM symbols per subframe is $N^{subframe,\ \mu}_{symb}=N^{slot}_{symb}N^{subframe,\ \mu}_{slot}$.

The OFDM symbol is a time domain unit of one communication scheme. For example, the OFDM symbol may be a time domain unit of CP-OFDM. The OFDM symbol may be a time domain unit of DFT-s-OFDM.

The slot may include multiple OFDM symbols. For example, $N^{slot}_{symb}$ consecutive OFDM symbols may be included in one slot. For example, $N^{slot}_{symb}$ may be 14.

The slot may be assigned an index in the time domain. For example, slot indices $n^{\mu}_{s}$ may be given in ascending order in the subframe with integer values within a range of 0 to $N^{subframe,\ \mu}_{slot}-1$. Slot indices $n^{\mu}_{s,f}$ may be given in ascending order in the radio frame with integer values within a range of 0 to $N^{frame,\ \mu}_{slot}-1$.

Figure 3:
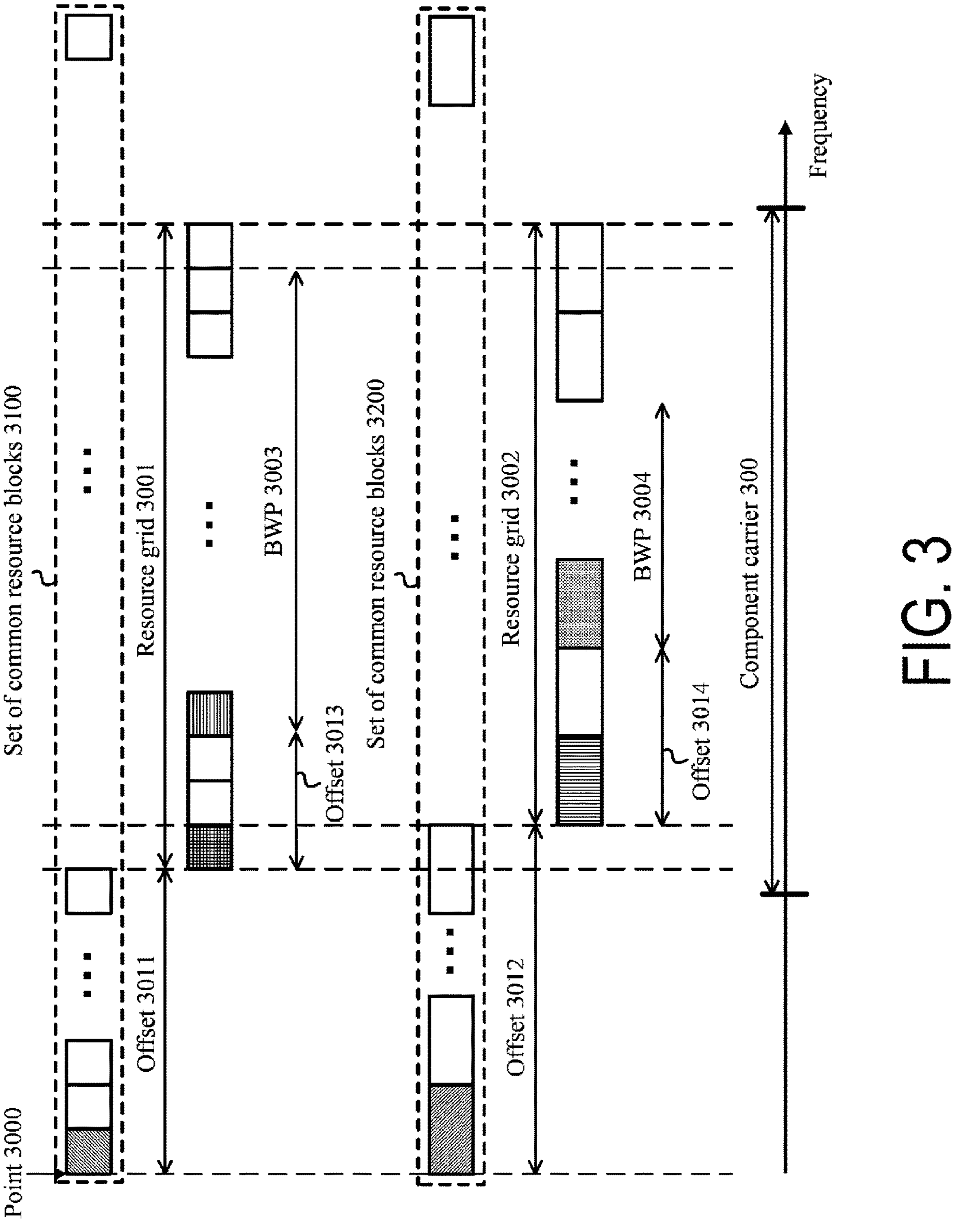
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing configuration $\mu_1$ in a component carrier 300, and a configuration example of a resource grid of a subcarrier spacing configuration $\mu_2$ in the certain component carrier. As described above, for a certain component carrier, one or more subcarrier spacings may be configured.

A Point 3000 is an identifier for identifying a certain subcarrier. The point 3000 is also referred to as a point A. A Common resource block (CRB) set 3100 is a set of common resource blocks for the subcarrier spacing configuration $\mu_1$.

In the common resource block set 3100, a common resource block (block hatched with lines rising diagonally up and to the right in FIG. 3) including the point 3000 is also referred to as a reference point of the common resource block set 3100. The reference point of the common resource block set 3100 is a common resource block having an index of 0 for the subcarrier spacing configuration $\mu_1$.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size,\ \mu}_{grid1,\ x}$ common resource blocks starting from the reference point of the resource grid 3001.

An offset 3013 is an offset from the reference point of the resource grid 3001 to a reference point ($N^{start,\ \mu}_{BWP,\ i1}$) of a BandWidth Part (BWP) 3003 having an index of i1. The reference point of the BWP 3003 having an index of i1 is a physical resource block having an index of 0 for the BWP.

A common resource block set 3200 is a set of common resource blocks for the subcarrier spacing configuration $\mu_2$.

In the common resource block set 3200, a common resource block (block hatched with lines rising diagonally up and to the left in FIG. 3) including the point 3000 is also referred to as a reference point of the common resource block set 3200. The reference point of the common resource block set 3200 is a common resource block having an index of 0 for the subcarrier spacing configuration $\mu_2$.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes $N^{size,\ \mu}_{grid2,\ x}$ common resource blocks starting from the reference point of the resource grid 3002.

An offset 3014 is an offset from the reference point of the resource grid 3002 to a reference point ($N^{start,\ \mu}_{BWP,\ i2}$) of a BWP 3004 having an index of i2. The reference point of the BWP 3004 having an index of i2 is a physical resource block having an index of 0 for the BWP.

Figure 4:
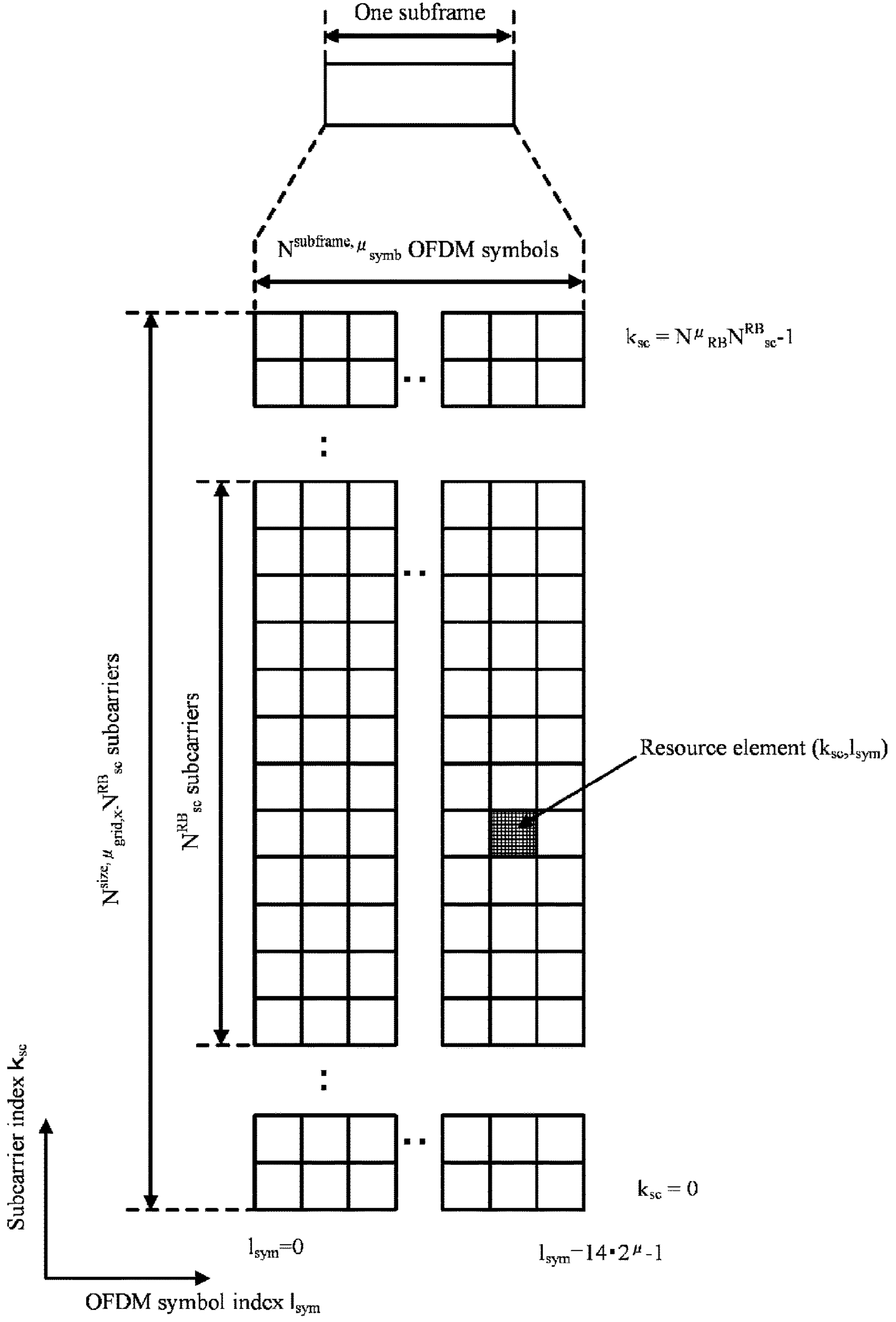
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $l_{sym}$, and the vertical axis corresponds to a subcarrier index $k_{sc}$. The resource grid 3001 includes $N^{size,\ \mu}_{grid1,\ x}N^{RB}_{sc}$ subcarriers and includes at least $N^{subframe,\ \mu}_{symb}$ OFDM symbols. In the resource grid, a resource identified by the subcarrier index $k_{sc}$ and the OFDM symbol index $l_{sym}$ is also referred to as a Resource Element (RE).

The frequency domain of the resource grid corresponds to an SCS-specific carrier. A configuration of the SCS-specific carrier includes a part or all of an offset and a band configuration. The offset indicates an offset from the reference point of the common resource block set to the reference point of the resource grid. For example, each of the offset 3011 and the offset 3012 is an offset included in the configuration of the SCS-specific carrier. The band configuration indicates a bandwidth of the SCS-specific carrier. Here, the bandwidth of the SCS-specific carrier corresponds to a bandwidth of the resource grid. For example, each of $N^{size,\ \mu}_{grid1,\ x}$ and $N^{size,\ \mu}_{grid2,\ x}$ is a band configuration included in the configuration of the SCS-specific carrier.

The Resource Block (RB) includes $N^{RB}_{sc}$ consecutive subcarriers. The resource block is a general term for a common resource block, a Physical Resource Block (PRB), and a Virtual Resource Block (VRB). For example, $N^{RB}_{sc}$ may be 12.

In the common resource block set for a certain subcarrier spacing configuration $\mu$, the common resource blocks are assigned indices in ascending order from 0 in the frequency domain. The common resource block having an index of 0 for a certain subcarrier spacing configuration $\mu$ includes (or collides with, matches) the point 3000. An index $n^{\mu}_{CRB}$ of the common resource block for a certain subcarrier spacing configuration $\mu$ satisfies a relationship of $n^{\mu}_{CRB}=\text{ceil}(k_{sc,\ c}/N^{RB}_{sc})$. Here, a subcarrier with $k_{sc,\ c}=0$ is a subcarrier having the same center frequency as the center frequency of a subcarrier corresponding to the point 3000. $k_{sc,\ c}$ indicates an index of a subcarrier in the common resource block set.

In the physical resource block set for a certain subcarrier spacing configuration $\mu$, the physical resource blocks are assigned indices in ascending order from 0 in the frequency domain. An index $n^{\mu}_{PRB}$ of the physical resource block for a certain subcarrier spacing configuration satisfies a relationship of $n^{\mu}_{CRB}=n^{\mu}_{PRB}+N^{start,\ \mu}_{BWP,\ i}$. Here, $N^{start,\ \mu}_{BWP,\ i}$ indicates a reference point of the BWP having an index of i.

The BWP may be configured as a part of a frequency band of the component carrier. For example, the BWP may be defined as a subset of common resource blocks included in the resource grid. For example, the BWP may include $N^{size,\ \mu}_{BWP,\ i}$ common resource blocks starting from the reference point $N^{start,\ \mu}_{BWP,\ i}$ of the BWP. A BWP configured for the downlink is also referred to as a downlink BWP. A BWP configured for the uplink is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. The symbol may correspond to a modulation symbol mapped to a resource element.

In a case that a large scale property of a channel over which a symbol on one antenna port is conveyed can be inferred from a channel over which a symbol on another antenna port is conveyed, the two antenna ports are considered to be in a Quasi Co-Located (QCL) relationship. The large scale property may include at least long term performance of a channel. The large scale property may include at least a part or all of delay spread, Doppler spread, Doppler shift, an average gain, an average delay, and a beam parameter (spatial Rx parameters). The fact that the first antenna port and the second antenna port are QCL with respect to a beam parameter may mean that a reception beam assumed by a receiver for the first antenna port and a reception beam assumed by the receiver for the second antenna port are the same. The fact that the first antenna port and the second antenna port are QCL with respect to a beam parameter may mean that a transmission beam assumed by a receiver for the first antenna port and a transmission beam assumed by the receiver for the second antenna port are the same. In a case that the large scale property of a channel over which a symbol on one antenna port is conveyed can be inferred from a channel over which a symbol on another antenna port is conveyed, the terminal apparatus 1 may assume that the two antenna ports are QCL. The fact that two antenna ports are QCL may mean that the two antenna ports are assumed to be QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
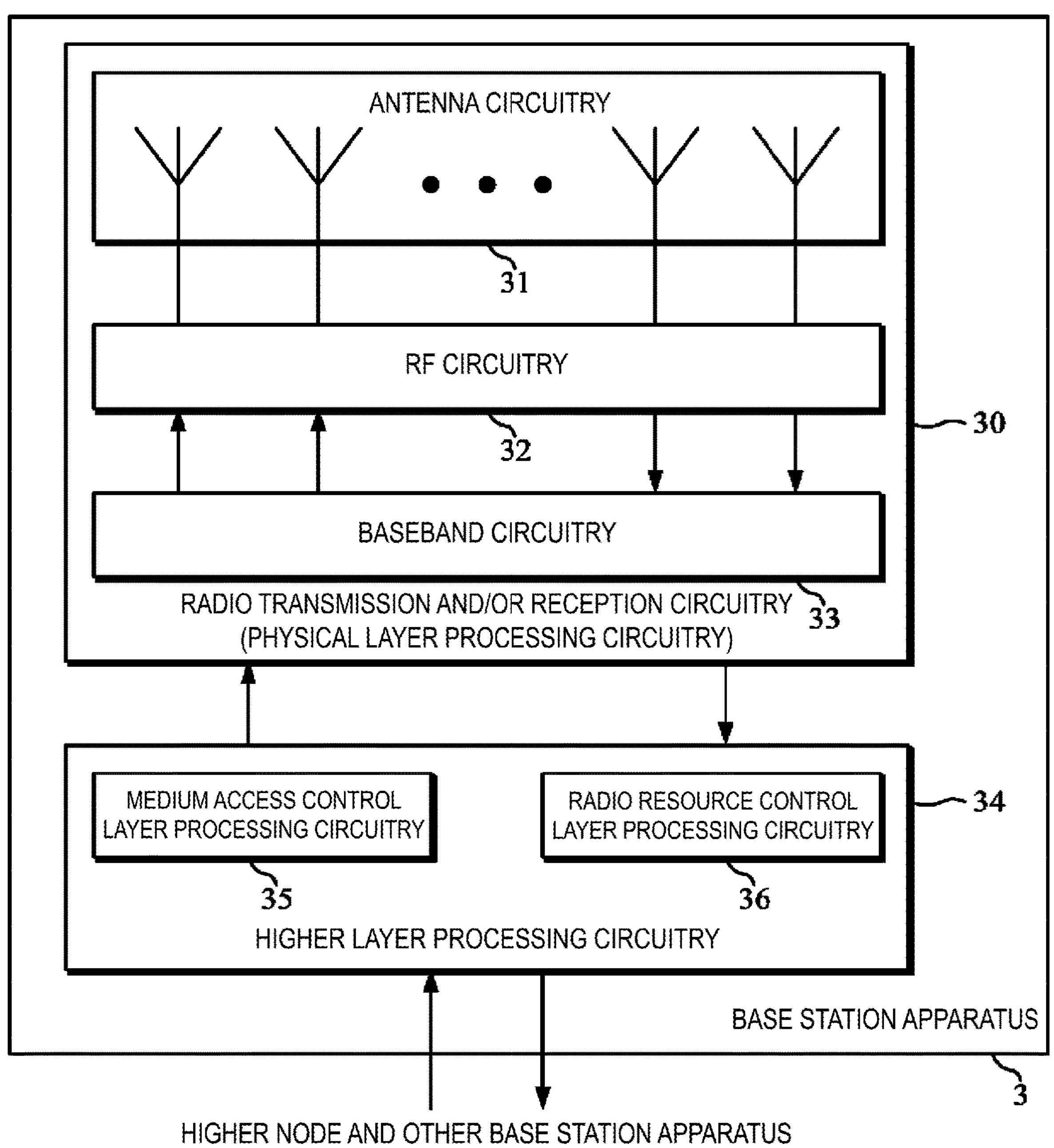
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 includes at least a part or all of a radio transmission and/or reception circuitry (physical layer processing circuitry) 30 and/or a higher layer processing circuitry 34. The radio transmission and/or reception circuitry 30 includes at least a part or all of an antenna circuitry 31, a Radio Frequency (RF) circuitry 32, and a baseband circuitry 33. The higher layer processing circuitry 34 includes at least a part or all of a medium access control layer processing circuitry 35 and a Radio Resource Control (RRC) layer processing circuitry 36.

The radio transmission and/or reception circuitry 30 includes at least a part or all of a radio transmission circuitry 30*a* and a radio reception circuitry 30*b*. Here, apparatus configurations of the baseband circuitry included in the radio transmission circuitry 30*a* and the baseband circuitry included in the radio reception circuitry 30*b* may be the same or different from each other. Apparatus configurations of the RF circuitry included in the radio transmission circuitry 30*a* and the RF circuitry included in the radio reception circuitry 30*b* may be the same or different from each other. Apparatus configurations of the antenna circuitry included in the radio transmission circuitry 30*a* and the antenna circuitry included in the radio reception circuitry 30*b* may be the same or different from each other.

For example, the radio transmission circuitry 30*a* may generate a baseband signal of a downlink physical channel. For example, the radio transmission circuitry 30*a* may generate a baseband signal of a downlink physical signal.

For example, the radio reception circuitry 30*b* may attempt to detect information conveyed on an uplink physical channel. For example, the radio reception circuitry 30*b* may attempt to detect information conveyed on an uplink physical signal.

The higher layer processing circuitry 34 outputs downlink data (for example, a transport block) to the radio transmission and/or reception circuitry 30 (or the radio transmission circuitry 30*a*). The higher layer processing circuitry 34 performs a part or all of processing operations of a Medium Access Control (MAC) layer, a Packet Data Convergence Protocol (PDCP) layer, a Radio Link Control (RLC) layer, and an RRC layer.

The medium access control layer processing circuitry 35 included in the higher layer processing circuitry 34 performs processing of the MAC layer.

The radio resource control layer processing circuitry 36 included in the higher layer processing circuitry 34 performs processing of the RRC layer. The radio resource control layer processing circuitry 36 manages various pieces of configuration information/parameters (for example, RRC parameters) of the terminal apparatus 1. The radio resource control layer processing circuitry 36 sets the RRC parameter based on an RRC message received from the terminal apparatus 1.

The radio transmission and/or reception circuitry 30 (or the radio transmission circuitry 30*a*) performs a part or all of modulation processing, coding processing, and transmission processing. The radio transmission and/or reception circuitry 30 (or the radio transmission circuitry 30*a*) generates a physical signal through a part or all of modulation processing, coding processing, and baseband signal generation (conversion into a time-continuous signal) processing performed on downlink data. The radio transmission and/or reception circuitry 30 (or the radio transmission circuitry 30*a*) may map the physical signal to a certain component carrier. The radio transmission and/or reception circuitry 30 (or the radio transmission circuitry 30*a*) transmits the generated physical signal.

The radio transmission and/or reception circuitry 30 (or the radio reception circuitry 30*b*) performs a part or all of demodulation processing, decoding processing, and reception processing. The radio transmission and/or reception circuitry 30 (or the radio reception circuitry 30*b*) outputs information detected based at least on demodulation processing and decoding processing performed on a received physical signal to the higher layer processing circuitry 34.

The radio transmission and/or reception circuitry 30 (or the radio reception circuitry 30*b*) may perform carrier sensing prior to transmission of the physical signal.

The RF circuitry 32 converts a signal received via the antenna circuitry 31 into a baseband signal by means of quadrature demodulation and removes unnecessary frequency components. The RF circuitry 32 outputs an analog signal to the baseband circuitry.

The baseband circuitry 33 converts an analog signal input from the RF circuitry 32 into a digital signal. The baseband circuitry 33 removes a portion corresponding to a Cyclic Prefix (CP) from the converted digital signal, performs a Fast Fourier Transform (FFT) on the signal from which the CP has been removed, and extracts a signal in the frequency domain.

The baseband circuitry 33 performs Inverse Fast Fourier Transform (IFFT) on downlink data to generate an OFDM symbol, adds a CP to the generated OFDM symbol, generates a baseband digital signal, and converts the baseband digital signal into an analog signal. The baseband circuitry 33 outputs the converted analog signal to the RF circuitry 32. Prior to the inverse fast Fourier transform, transform precoding may be applied to the downlink data.

The RF circuitry 32 removes an unnecessary frequency component from the analog signal input from the baseband circuitry 33 by using a low-pass filter, up converts the analog signal into a signal having a carrier frequency, and transmits the signal via the antenna circuitry 31. The RF circuitry 32 may have a function of controlling transmission power. The RF circuitry 32 is also referred to as a transmission power control circuitry.

For the terminal apparatus 1, one or more serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfiguration with synchronization).

The SCell may be included in either of the MCG or the SCG.

A serving cell group (cell group) is a term at least including an MCG and an SCG. The serving cell group may include one or more serving cells (or component carriers). One or more serving cells (or component carriers) included in the serving cell group may be operated by means of carrier aggregation.

One or more downlink BWPs may be configured for each of the serving cells (or downlink component carriers). One or more uplink BWPs may be configured for each of the serving cells (or uplink component carriers).

Among one or more downlink BWPs configured for the serving cell (or the downlink component carrier), one downlink BWP may be configured as an active downlink BWP (or one downlink BWP may be activated). Among one or more uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP and activating any one of the inactive uplink BWPs other than the one active uplink BWP. The uplink BWP switch may be controlled by a BWP field included in downlink control information. The uplink BWP switch may be controlled based on a higher layer parameter.

Among one or more downlink BWPs configured for the serving cell, two or more downlink BWPs need not be configured for the active downlink BWP. For the serving cell, at certain time, one downlink BWP may be active.

Among one or more uplink BWPs configured for the serving cell, two or more uplink BWPs need not be configured for the active uplink BWP. For the serving cell, at certain time, one uplink BWP may be active.

Figure 6:
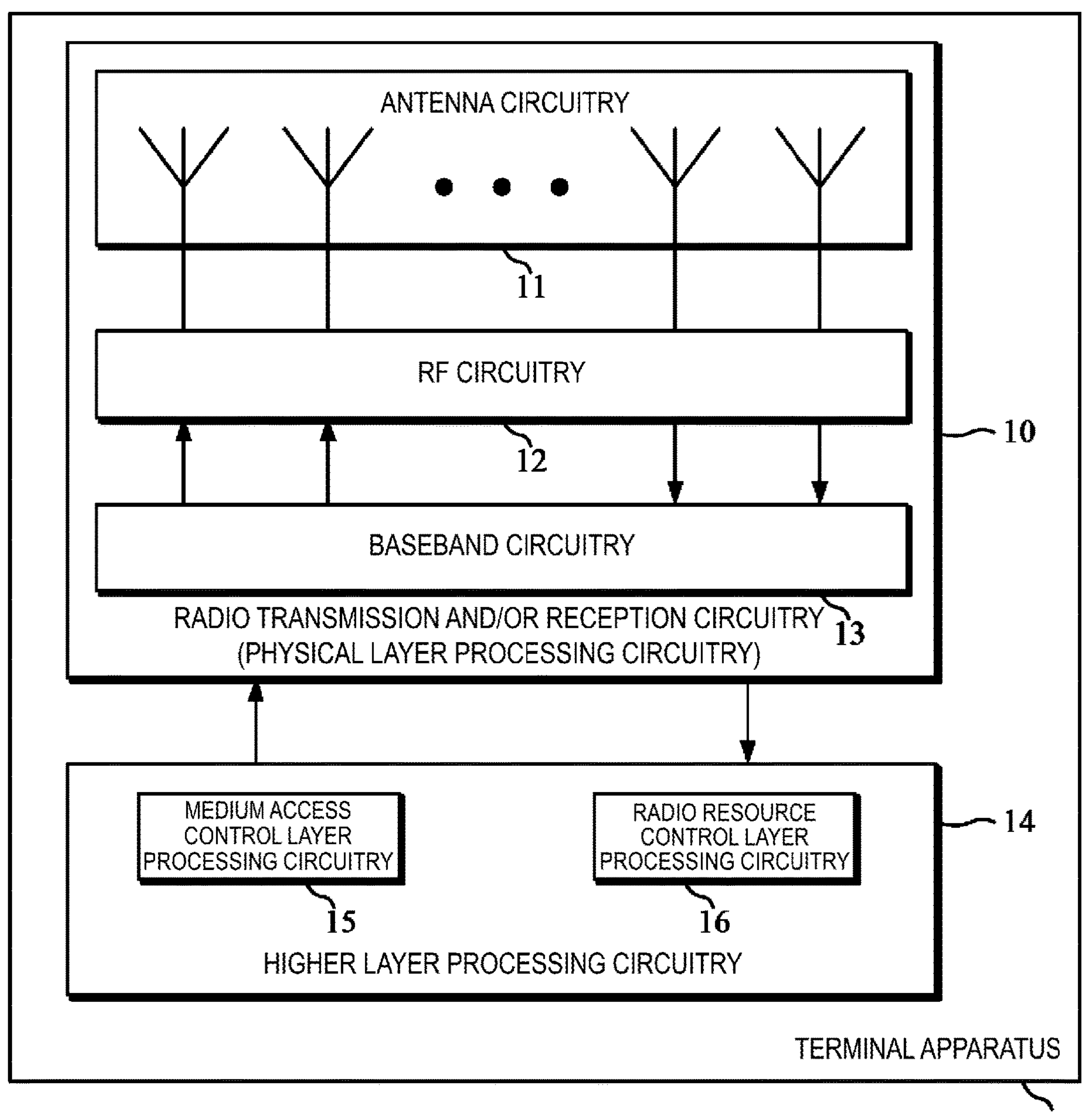
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 includes at least a part or all of a radio transmission and/or reception circuitry (physical layer processing circuitry) 10 and a higher layer processing circuitry 14. The radio transmission and/or reception circuitry 10 includes at least a part or all of an antenna circuitry 11, an RF circuitry 12, and a baseband circuitry 13. The higher layer processing circuitry 14 includes at least a part or all of a medium access control layer processing circuitry 15 and a radio resource control layer processing circuitry 16.

The radio transmission and/or reception circuitry 10 includes at least a part or all of a radio transmission circuitry **10*a* and a radio reception circuitry 10*b*. Here, apparatus configurations of the baseband circuitry 13 included in the radio transmission circuitry 10*a* and the baseband circuitry 13 included in the radio reception circuitry 10*b* may be the same or different from each other. Apparatus configurations of the RF circuitry 12 included in the radio transmission circuitry 10*a* and the RF circuitry 12 included in the radio reception circuitry 10*b* may be the same or different from each other. Apparatus configurations of the antenna circuitry 11 included in the radio transmission circuitry 10*a* and the antenna circuitry 11 included in the radio reception circuitry 10*b*** may be the same or different from each other.

For example, the radio transmission circuitry **10*a* may generate a baseband signal of an uplink physical channel. For example, the radio transmission circuitry 10*a*** may generate a baseband signal of an uplink physical signal.

For example, the radio reception circuitry **10*b* may attempt to detect information conveyed on a downlink physical channel. For example, the radio reception circuitry 10*b*** may attempt to detect information conveyed on an uplink physical signal.

The higher layer processing circuitry 14 outputs uplink data (for example, a transport block) to the radio transmission and/or reception circuitry 10 (or the radio transmission circuitry **10*a*). The higher layer processing circuitry 14** performs a part or all of processing operations of a MAC layer, a packet data convergence protocol layer, a radio link control layer, and an RRC layer.

The medium access control layer processing circuitry 15 included in the higher layer processing circuitry 14 performs processing of the MAC layer.

The radio resource control layer processing circuitry 16 included in the higher layer processing circuitry 14 performs processing of the RRC layer. The radio resource control layer processing circuitry 16 manages various pieces of configuration information/parameters (for example, RRC parameters) of the terminal apparatus 1. The radio resource control layer processing circuitry 16 sets the RRC parameters based on an RRC message received from the base station apparatus 3.

The radio transmission and/or reception circuitry 10 (or the radio transmission circuitry 10*a*) performs a part or all of modulation processing, coding processing, and transmission processing. The radio transmission and/or reception circuitry 10 (or the radio transmission circuitry 10*a*) generates a physical signal through a part or all of modulation processing, coding processing, and baseband signal generation (conversion into a time-continuous signal) processing performed on uplink data. The radio transmission and/or reception circuitry 10 (or the radio transmission circuitry 10*a*) may map the physical signal to a certain BWP (active uplink BWP). The radio transmission and/or reception circuitry 10 (or the radio transmission circuitry 10*a*) transmits the generated physical signal.

The radio transmission and/or reception circuitry 10 (or the radio reception circuitry 10*b*) performs a part or all of demodulation processing, decoding processing, and reception processing. The radio transmission and/or reception circuitry 10 (or the radio reception circuitry 30*b*) may receive a physical signal in a certain BWP (active downlink BWP) of a certain serving cell. The radio transmission and/or reception circuitry 10 (or the radio reception circuitry 10*b*) outputs information detected based at least on demodulation processing and decoding processing performed on the received physical signal to the higher layer processing circuitry 14.

The radio transmission and/or reception circuitry 10 (radio reception circuitry 10*b*) may perform carrier sensing prior to transmission of the physical signal.

The RF circuitry 12 converts a signal received via the antenna circuitry 11 into a baseband signal by means of quadrature demodulation and removes unnecessary frequency components. The RF circuitry 12 outputs a processed analog signal to the baseband circuitry 13.

The baseband circuitry 13 converts the analog signal input from the RF circuitry 12 into a digital signal. The baseband circuitry 13 removes a portion corresponding to a Cyclic Prefix (CP) from the converted digital signal, performs a Fast Fourier Transform (FFT) on the signal from which the CP has been removed, and extracts a signal in the frequency domain.

The baseband circuitry 13 performs Inverse Fast Fourier Transform (IFFT) on uplink data to generate an OFDM symbol, adds a CP to the generated OFDM symbol, generates a baseband digital signal, and converts the baseband digital signal into an analog signal. The baseband circuitry 13 outputs the converted analog signal to the RF circuitry 12. Prior to the inverse fast Fourier transform, transform precoding may be applied to the uplink data.

The RF circuitry 12 removes unnecessary frequency components from the analog signal input from the baseband circuitry 13 through a low-pass filter, up converts the analog signal into a signal having a carrier frequency, and transmits the signal via the antenna circuitry 11. The RF circuitry 12 may have a function of controlling transmission power. The RF circuitry 12 is also referred to as a transmission power control circuitry.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the uplink of the radio communication system according to an aspect of the present embodiment, at least a part or all of the following uplink physical channels may be used.

Physical Uplink Control CHannel (PUCCH)

Physical Uplink Shared CHannel (PUSCH)

Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) includes at least a part or all of Channel State Information (CSI), a Scheduling Request (SR), and Hybrid Automatic Repeat request ACKnowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as a HARQ-ACK information bit or a HARQ-ACK information sequence.

The HARQ-ACK information may include at least a HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared CHannel (PUSCH)). The HARQ-ACK may indicate an acknowledgement (ACK) or a negative-acknowledgement (NACK) corresponding to the transport block. The ACK may indicate that decoding of the transport block has been decoded successfully. The NACK may indicate that decoding of the transport block has not been decoded successfully. The HARQ-ACK information may include a HARQ-ACK codebook including one or more HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for new transmission. The scheduling request bit may be used for indicating either of a positive SR or a negative SR. The scheduling request bit indicating the positive SR is also referred to as "the positive SR being transmitted". The positive SR may indicate that a resource of the PUSCH (or the UL-SCH) for new transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for new transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least a part or all of a Channel Quality Indicator (CQI), a Precoder Matrix Indicator (PMI), and a Rank Indicator (RI). The CQI is an indicator related to quality (for example, propagation strength) of a propagation path or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1 based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n)=x_u(\mathrm{mod}(n+C_v, L_{RA}))$. $x_u$ may be a Zadoff Chu (ZC) sequence. $x_u$ is defined by $x_u=\exp(-j\pi ui(i+1)/L_{RA})$. j is an imaginary unit. $\pi$ is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. Each of the random access preambles is identified (determined, given) based at least on the cyclic shift $C_v$ of the PRACH sequence and the sequence index u for the PRACH sequence. Each of the 64 identified random access preambles may be assigned an index.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the uplink of the radio communication system according to an aspect of the present embodiment, at least a part or all of the following uplink physical signals may be used.

UpLink Demodulation Reference Signal (UL DMRS)

Sounding Reference Signal (SRS)

UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated (or may be scheduled) by one DCI format. The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a propagation path of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated (or may be triggered) by one DCI format. Resource element mapping of the PUCCH and/or resource element mapping of the DMRS for the PUCCH may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a propagation path of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the downlink of the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or more higher layer parameters.

The physical layer control information includes 8 bits. The physical layer control information may include at least a part or all of the following 0A to 0D.

0A) Radio frame bit
0B) Half radio frame (half system frame, half frame) bit
0C) SS/PBCH block index bit
0D) Subcarrier offset bit The radio frame bit is used for indicating a radio frame in which the PBCH is transmitted (radio frame including a slot in which the PBCH is transmitted). The radio frame bit includes 4 bits. The radio frame bit may include 4 bits out of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits out of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

A DCI format 0_0, a DCI format 0_1, a DCI format 1_0, and a DCI format 1_1 are DCI formats including a set of fields different from each other. An uplink DCI format is a general term for the DCI format 0_0 and the DCI format 0_1. A downlink DCI format is a general term for the DCI format 1_0 and the DCI format 1_1.

The DCI format 0_0 is at least used for scheduling the PUSCH of a certain cell (or mapped to a certain cell). The DCI format 0_0 includes at least a part or all of fields listed from 1A to 1E.

1A) Identifier field for DCI formats
1B) Frequency domain resource assignment field
1C) Time domain resource assignment field
1D) Frequency hopping flag field
1E) Modulation and Coding Scheme (MCS) field The identifier field for DCI formats may indicate whether the DCI format including the identifier field for DCI formats is an uplink DCI format or a downlink DCI format. The identifier field for DCI formats included in the DCI format 0_0 may indicate 0 (or may indicate that the DCI format 0_0 is an uplink DCI format).

The frequency domain resource assignment field included in the DCI format 0_0 may be at least used for indicating assignment of frequency resources for the PUSCH.

The time domain resource assignment field included in the DCI format 0_0 may be at least used for indicating assignment of time resources for the PUSCH.

The frequency hopping flag field may be at least used for indicating whether frequency hopping is applied to the PUSCH.

The MCS field included in the DCI format 0_0 may be at least used for indicating a part or all of a modulation scheme for the PUSCH and/or a target coding rate. The target coding rate may be a target coding rate for the transport block of the PUSCH. The Transport Block Size (TBS) of the PUSCH may be given based at least on a part or all of the target coding rate and the modulation scheme for the PUSCH.

The DCI format 0_0 need not include a field used for a CSI request. In other words, CSI need not be requested by using the DCI format 0_0.

The DCI format 0_0 need not include a carrier indicator field. In other words, the uplink component carrier to which the PUSCH scheduled by a DCI format 0_0 is mapped may be the same as the uplink component carrier to which the PDCCH including the DCI format 0_0 is mapped.

The DCI format 0_0 need not include the BWP field. In other words, the uplink BWP to which the PUSCH scheduled by a DCI format 0_0 is mapped may be the same as the uplink BWP to which the PDCCH including the DCI format 00 is mapped.

The DCI format 0_1 is at least used for scheduling of the PUSCH of a certain cell (mapped to a certain cell). The DCI format 0_1 includes at least a part or all of fields listed from 2A to 2H.

2A) Identifier field for DCI formats
2B) Frequency domain resource assignment field
2C) Uplink time domain resource assignment field 2D) Frequency hopping flag field
2E) MCS field
2F) CSI request field
2G) BWP field
2H) Carrier indicator field The identifier field for DCI formats included in the DCI format 0_1 may indicate 0 (or may indicate that the DCI format 0_1 is an uplink DCI format).

The frequency domain resource assignment field included in the DCI format 0_1 may be at least used for indicating assignment of frequency resources for the PUSCH.

The time domain resource assignment field included in the DCI format 0_1 may be at least used for indicating assignment of time resources for the PUSCH.

The MCS field included in the DCI format 0_1 may be at least used for indicating a part or all of a modulation scheme for the PUSCH and/or a target coding rate.

In a case that the BWP field is included in the DCI format 0_1, the BWP field may be used for indicating an uplink BWP to which the PUSCH is mapped. In a case that the BWP field is not included in the DCI format 0_1, the uplink BWP to which the PUSCH is mapped may be the same as the uplink BWP to which the PDCCH including the DCI format 0_1 used for scheduling of the PUSCH is mapped. In a case that the number of uplink BWPs configured for the terminal apparatus 1 in a certain uplink component carrier is two or more, the number of bits of the BWP field included in the DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in the DCI format 0_1 used for scheduling of the PUSCH mapped to the certain uplink component carrier may be κ bits (or the BWP field need not be included in the DCI format 0_1 used for scheduling of the PUSCH mapped to the certain uplink component carrier).

The CSI request field is at least used for indicating the report of the CSI.

In a case that the carrier indicator field is included in the DCI format 0_1, the carrier indicator field may be used for indicating the uplink component carrier to which the PUSCH is mapped. In a case that the carrier indicator field is not included in the DCI format 0_1, the uplink component carrier to which the PUSCH is mapped may be the same as the uplink component carrier to which the PDCCH including the DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in the DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in the DCI format 0_1 used for scheduling of the PUSCH mapped to the certain serving cell group may be 0 bits (or the carrier indicator field need not be included in the DCI format 0_1 used for scheduling of the PUSCH mapped to the certain serving cell group).

The DCI format 1_0 is at least used for scheduling of the PDSCH of a certain cell (mapped to a certain cell). The DCI format 1_0 includes at least a part or all of 3A to 3F.

3A) Identifier field for DCI formats
3B) Frequency domain resource assignment field
3C) Time domain resource assignment field
3D) MCS field
3E) PDSCH to HARQ feedback timing indicator field
3F) PUCCH resource indicator field The identifier field for DCI formats included in the DCI format 1_0 may indicate 1 (or may indicate that the DCI format 1_0 is a downlink DCI format).

The frequency domain resource assignment field included in the DCI format 10 may be at least used for indicating assignment of frequency resources for the PDSCH.

The time domain resource assignment field included in the DCI format 1_0 may be at least used for indicating assignment of time resources for the PDSCH.

The MCS field included in the DCI format 1_0 may be at least used for indicating a part or all of a modulation scheme for the PDSCH and/or a target coding rate. The target coding rate may be a target coding rate for the transport block of the PDSCH. The Transport Block Size (TBS) of the PDSCH may be given based at least on a part or all of the target coding rate and the modulation scheme for the PDSCH.

The PDSCH to HARQ feedback timing indicator field may be at least used for indicating an offset from the slot including the last OFDM symbol of the PDSCH to the slot including the first OFDM symbol of the PUCCH.

The PUCCH resource indicator field may be a field indicating an index of one of one or more PUCCH resources included in a PUCCH resource set. The PUCCH resource set may include one or more PUCCH resources.

The DCI format 1_0 need not include the carrier indicator field. In other words, the downlink component carrier to which the PDSCH scheduled by using a DCI format 1_0 is mapped may be the same as the downlink component carrier to which the PDCCH including the DCI format 1_0 is mapped.

The DCI format 1_0 need not include the BWP field. In other words, the downlink BWP to which the PDSCH scheduled by using a DCI format 1_0 is mapped may be the same as the downlink BWP to which the PDCCH including the DCI format 10 is mapped.

The DCI format 1_1 is at least used for scheduling the PDSCH of a certain cell (or mapped to a certain cell). The DCI format 1_1 includes at least a part or all of 4A to 4I.

4A) Identifier field for DCI formats
4B) Frequency domain resource assignment field
4C) Time domain resource assignment field
4E) MCS field
4F) PDSCH to HARQ feedback timing indicator field
4G) PUCCH resource indicator field
4H) BWP field
4I) Carrier indicator field The identifier field for DCI formats included in the DCI format 1_1 may indicate 1 (or may indicate that the DCI format 1_1 is a downlink DCI format).

The frequency domain resource assignment field included in the DCI format 1_1 may be at least used for indicating assignment of frequency resources for the PDSCH.

The time domain resource assignment field included in the DCI format 1_1 may be at least used for indicating assignment of time resources for the PDSCH.

The MCS field included in the DCI format 1_1 may be at least used for indicating a part or all of the modulation scheme for the PDSCH and/or the target coding rate.

In a case that the PDSCH to HARQ feedback timing indicator field is included in the DCI format 1_1, the PDSCH to HARQ feedback timing indicator field may be at least used for indicating an offset from the slot including the last OFDM symbol of the PDSCH to the slot including the first OFDM symbol of the PUCCH. In a case that the PDSCH to HARQ feedback timing indicator field is not included in the DCI format 1_1, an offset from the slot including the last OFDM symbol of the PDSCH to the slot including the first OFDM symbol of the PUCCH may be identified by a higher layer parameter.

The PUCCH resource indicator field may be a field indicating an index of one of one or more PUCCH resources included in a PUCCH resource set.

In a case that the BWP field is included in the DCI format 1_1, the BWP field may be used for indicating the downlink BWP to which the PDSCH is mapped. In a case that the BWP field is not included in the DCI format 1_1, the downlink BWP to which the PDSCH is mapped may be the same as the downlink BWP to which the PDCCH including the DCI format 1_1 used for scheduling of the PDSCH is mapped. In a case that the number of downlink BWPs configured for the terminal apparatus 1 in a certain downlink component carrier is two or more, the number of bits of the BWP field included in the DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in the DCI format 1_1 used for scheduling of the PDSCH mapped to the certain downlink component carrier may be 0 bits (or the BWP field need not be included in the DCI format 1_1 used for scheduling of the PDSCH mapped to the certain downlink component carrier).

In a case that the carrier indicator field is included in the DCI format 1_1, the carrier indicator field may be used for indicating the downlink component carrier to which the PDSCH is mapped. In a case that the carrier indicator field is not included in the DCI format 1_1, the downlink component carrier to which the PDSCH is mapped may be the same as the downlink component carrier to which the PDCCH including the DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in the DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in the DCI format 1_1 used for scheduling of the PDSCH mapped to the certain serving cell group may be 0 bits (or the carrier indicator field need not be included in the DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the downlink of the radio communication system according to an aspect of the present embodiment, at least a part or all of the following downlink physical signals may be used.

Synchronization signal (SS)

DownLink DeModulation Reference Signal (DL DMRS)

Channel State Information-Reference Signal (CSI-RS)

DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
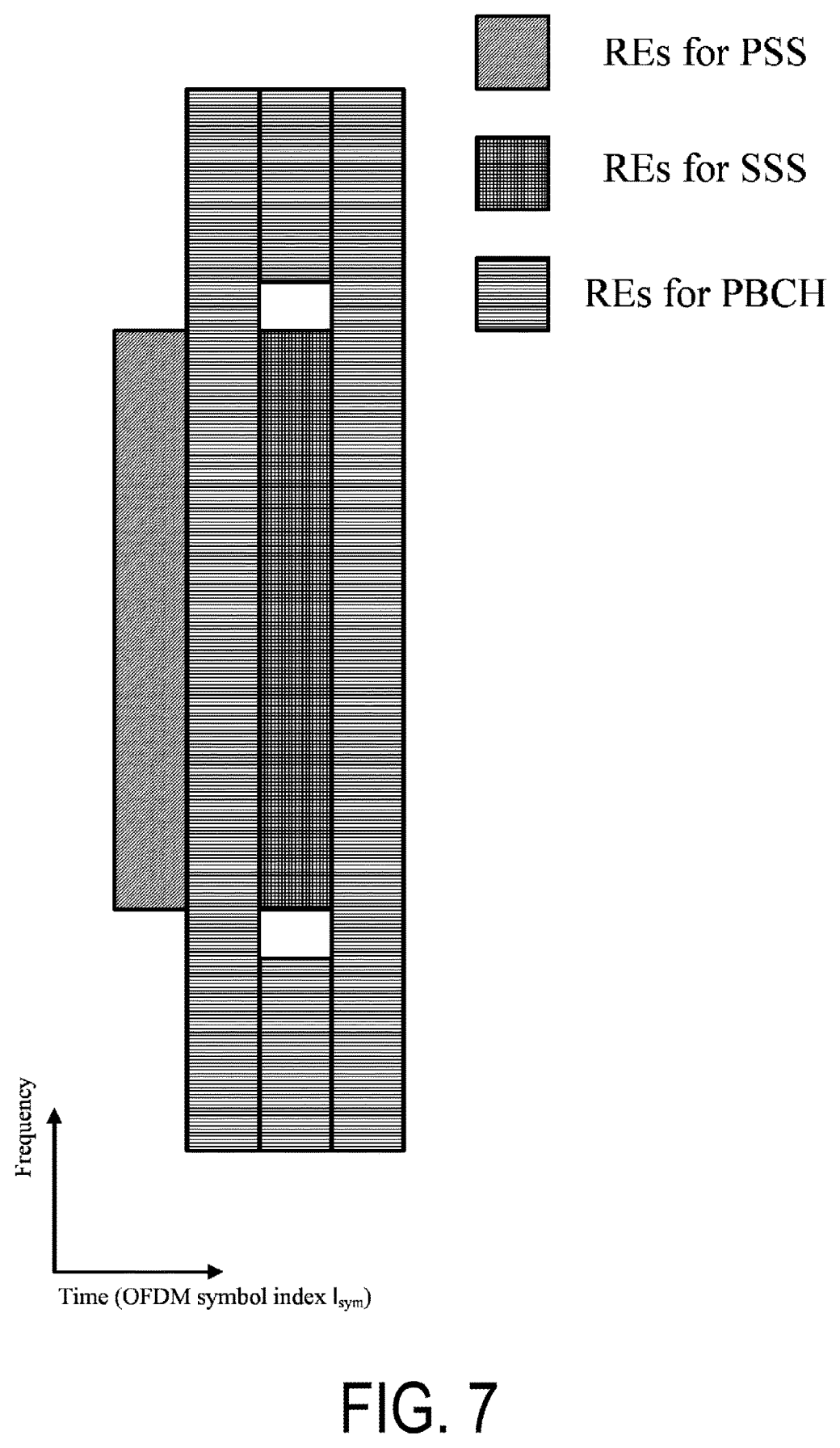

FIG. 7 is a diagram illustrating a configuration example of the SS/PBCH block according to an aspect of the present embodiment. In FIG. 7, the horizontal axis corresponds to a time axis (OFDM symbol index $l_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four consecutive OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH over which the symbol of the PBCH on a certain antenna port is conveyed may be inferred from the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a propagation path of the PDSCH may be inferred from the DMRS for the PDSCH. In a case that a set of resource elements in which the symbol of a certain PDSCH is conveyed and a set of resource elements in which the symbol of the DMRS for the certain PDSCH is conveyed are included in the same Precoding Resource Group (PRG), the PDSCH over which the symbol of the PDSCH on a certain antenna port is conveyed may be inferred from the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a propagation path of the PDCCH may be inferred from the DMRS for the PDCCH. In a case that the same precoder is (assumed to be) applied to a set of resource elements in which the symbol of a certain PDCCH is conveyed and a set of resource elements in which the symbol of the DMRS for the certain PDCCH is conveyed, the PDCCH over which the symbol of the PDCCH on a certain antenna port is conveyed may be inferred from the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. The Common Control CHannel (CCCH) may be used for transmitting a common RRC message in multiple terminal apparatuses 1. Here, the CCCH may be, for example, used for the terminal apparatus 1 that is not in a state of RRC connection. The Dedicated Control CHannel (DCCH) may be at least used for transmitting an RRC message dedicated to the terminal apparatus 1. Here, the DCCH may be, for example, used for the terminal apparatus 1 that is in a state of RRC connection.

The RRC message includes one or more RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Control Element (MAC CE). In other words, the higher layer parameter is a general term for the MIB, the system information, a message corresponding to the CCCH, a message corresponding to the DCCH, and parameters included in the MAC CE. The parameters included in the MAC CE are transmitted by a MAC Control Element (CE) command.

Procedures performed by the terminal apparatus 1 include at least a part or all of the following 5A to 5C.

5A) Cell search

5B) Random access

5C) Data communication

The cell search is a procedure used for the terminal apparatus 1 synchronizing with a certain cell related to the time domain and the frequency domain and detecting a physical cell identity (physical cell ID). In other words, by means of the cell search, the terminal apparatus 1 may perform synchronization with a certain cell in the time domain and the frequency domain and detect a physical cell ID.

A sequence of the PSS is given based at least on the physical cell ID. A sequence of the SSS is given based at least on the physical cell ID.

An SS/PBCH block candidate indicates a resource allowed to (possible to, scheduled to, configured to, defined to, having a possibility to) transmit the SS/PBCH block.

A set of SS/PBCH block candidates in a certain half radio frame is also referred to as an SS burst set. The SS burst set is also referred to as a transmission window, an SS transmission window, or a Discovery Reference Signal (DRS) transmission window.

The base station apparatus 3 transmits SS/PBCH blocks with one or more indices in a prescribed periodicity. The terminal apparatus 1 may detect at least one SS/PBCH block out of the SS/PBCH blocks with one or more indices and attempt decoding of the PBCH included in the at least one SS/PBCH block.

The random access is a procedure including at least a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or more PRACH occasions based at least on the index of the SS/PBCH block candidate detected based on the cell search. Each of the PRACH occasions is defined based at least on resources in the time domain and the frequency domain.

The terminal apparatus 1 transmits one random access preamble selected out of the PRACH occasions corresponding to the indices of the SS/PBCH block candidates in which the SS/PBCH block is detected.

The message 2 is a procedure for attempting to detect a DCI format 1_0 with a Cyclic Redundancy Check (CRC) scrambled with a Random Access-Radio Network Temporary Identifier (RA-RNTI) by the terminal apparatus 1. The terminal apparatus 1 attempts detection of the PDCCH including the DCI format in a control resource set given based on the MIB, which is included in the PBCH included in the SS/PBCH block detected based on cell search, and in resources indicated based on a configuration of a search space set. The message 2 is also referred to as a random access response.

The message 3 is a procedure for transmitting the PUSCH scheduled by using a random access response grant included in a DCI format 1_0 detected through the procedure of the message 2. Here, the random access response grant is indicated by the MAC CE included in the PDSCH scheduled by using the DCI format 1_0.

The PUSCH scheduled based on the random access response grant is either a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled by using a DCI format 0_0 with a CRC scrambled based on a Temporary Cell-Radio Network Temporary Identifier (TC-RNTI).

The message 4 is a procedure for attempting to detect a DCI format 1_0 with a CRC scrambled based on either of a Cell-Radio Network Temporary Identifier (C-RNTI) or a TC-RNTI. The terminal apparatus 1 receives a PDSCH scheduled based on the DCI format 1_0. The PDSCH may include a contention resolution ID.

Data communication is a general term for downlink communication and uplink communication.

In the data communication, the terminal apparatus 1 attempts detection of the PDCCH (monitors the PDCCH, supervises the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping) or may include distributed resources (interleaver mapping).

A set of resource blocks constituting the control resource set may be indicated by the higher layer parameter. The number of OFDM symbols constituting the control resource set may be indicated by the higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by the higher layer parameter.

For a certain search space set, a part or all of 6A to 6C may be indicated by at least the higher layer parameter.

6A) PDCCH monitoring periodicity

6B) PDCCH monitoring pattern within a slot

6C) PDCCH monitoring offset

The monitoring occasion of a certain search space set may correspond to the OFDM symbol to which the first OFDM symbol of a control resource set related to the certain search space set is mapped. The monitoring occasion of a certain search space set may correspond to a resource of a control resource set starting from the first OFDM symbol of the control resource set related to the certain search space set. The monitoring occasion of the search space set is given based at least on a part or all of the monitoring periodicity of the PDCCH, the monitoring pattern of the PDCCH in a slot, and the monitoring offset of the PDCCH.

Figure 8:
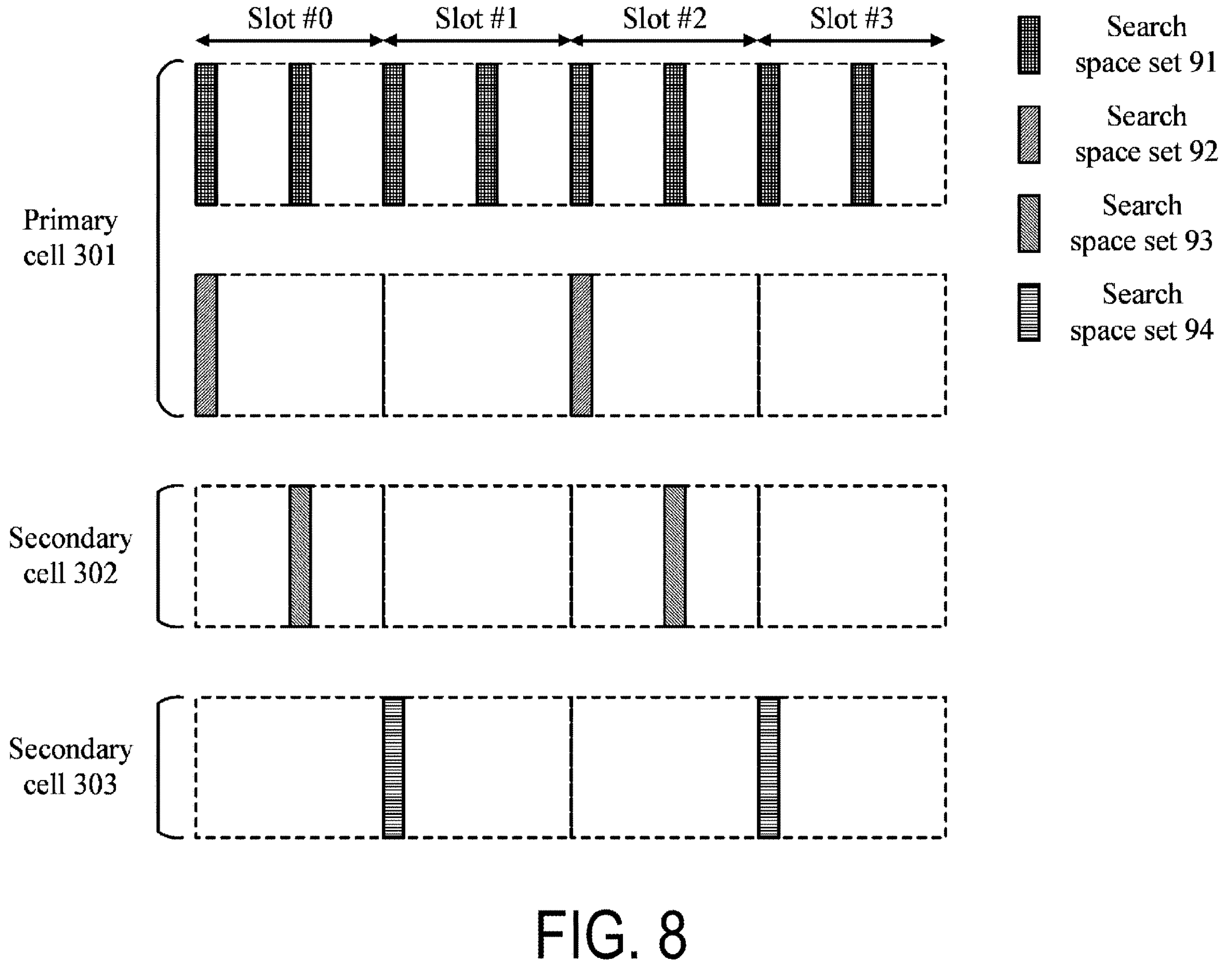
FIG. 8 is a diagram illustrating an example of monitoring occasions for search space sets according to an aspect of the present embodiment.

FIG. 8 is a diagram illustrating an example of the monitoring occasions for the search space sets according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0]. In other words, the monitoring occasions for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In the downlink communication, the terminal apparatus 1 detects a downlink DCI format. The detected downlink DCI format is at least used for resource assignment of the PDSCH. The detected downlink DCI format is also referred to as a downlink assignment. The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In the uplink communication, the terminal apparatus 1 detects an uplink DCI format. The detected DCI format is at least used for resource assignment of the PUSCH. The detected uplink DCI format is also referred to as an uplink grant. The terminal apparatus 1 performs transmission of the PUSCH.

In configured grant, the uplink grant for scheduling the PUSCH is configured for each transmission periodicity of the PUSCH. A part or all of pieces of information indicated by an uplink DCI format in a case that the PUSCH is scheduled by the uplink DCI format may be indicated by the uplink grant configured in a case of the configured grant.

Figure 9:
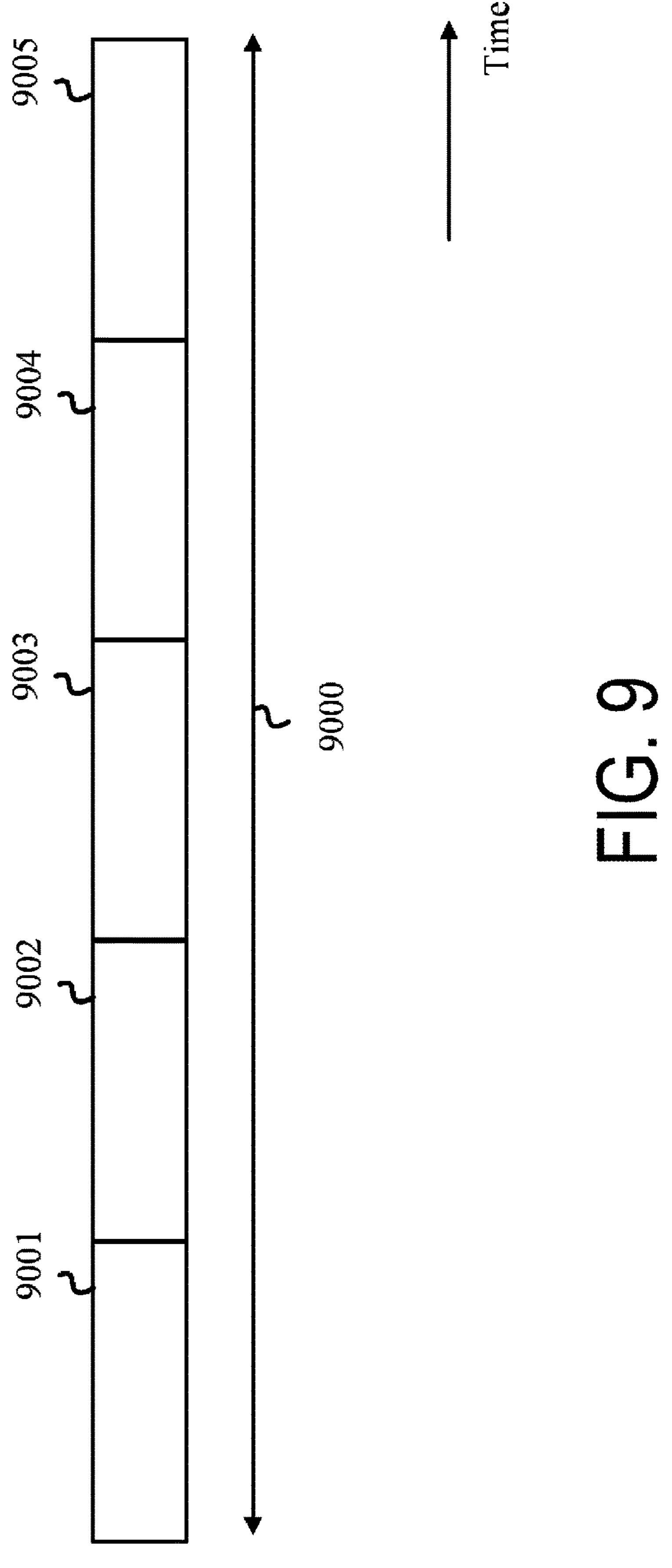
FIG. 9 is a diagram illustrating an example of PUSCH transmission according to an aspect of the present embodiment.

FIG. 9 is a diagram illustrating an example of PUSCH transmission according to an aspect of the present embodiment. The horizontal axis in FIG. 9 is a time axis. A Certain duration 9000 is configured on the time axis. PUSCH instances 9001 to 9005 are included in the certain duration 9000. Here, transmission of a series of the PUSCH instances included in the certain duration 9000 is also referred to as PUSCH transmission $T_{9000}$.

Here, the PUSCH instance is a unit of baseband signal generation of the PUSCH. That is, the baseband circuitry 13 may perform the baseband signal generation of the uplink data for each PUSCH instance. Here, the baseband signal generation of the uplink data is also referred to as baseband processing. Here, the baseband signal generation of the uplink data by the baseband circuitry 13 includes at least a part or all of the following procedures B1 to B8.

Procedure B1) Scrambling
Procedure B2) Modulation processing
Procedure B3) Layer mapping
Procedure B4) Transform precoding
Procedure B5) Precoding
Procedure B6) Symbol mapping to VRB
Procedure B7) Mapping from VRB to PRB
Procedure B8) Baseband signal generation Prior to performing the procedure B1, the baseband circuitry 13 generates a bit sequence b based at least on uplink data coding. Here, elements of the bit sequence b are referred to as b(k). Here, k is an integer from 0 to $M_{bit}-1$. Mbit indicates the length (or size) of the bit sequence b.

In the procedure B1, scrambling is applied to the bit sequence b. For example, in the procedure B1, the elements b(k) of the bit sequence b may be scrambled with elements c(k) of a bit sequence c. For example, in the procedure B1, the bit sequence $b^a$ may be generated by a calculation processing $b^a(k)=\mathrm{mod}(b(k)+c(k), 2)$. Here, the bit sequence c is a bit sequence used for scrambling. The bit sequence c may be a pseudo-random sequence. Here, a value of the RNTI used for scrambling of the CRC added to the DCI format used for scheduling the PUSCH instance may be used for initialization of the bit sequence c. The bit sequence $b^a$ is input to the procedure B2.

In a case that scrambling is not performed in the procedure B1, the bit sequence b, which is input information of the procedure B1, may be input to the bit sequence procedure B2 as $b^a$.

In the procedure B2, the modulation processing is applied to the bit sequence $b^a$. The complex-valued symbol sequence d generated by the modulation processing on the bit sequence $b^a$ is input to the procedure B3. Here, elements of the complex-valued symbol sequence d are denoted by d(j). j is an integer from 0 to $M_{symb}-1$. Here, the type of modulation processing may include a part or all of Quadrature Phase Shift Keying (QPSK), 16 Quadrature Amplitude Modulation (QAM), 64QAM, 256QAM, and 1024QAM.

In a case that the modulation processing is not performed in the procedure B2, the bit sequence $b^a$, which is input information of the procedure B2, may be input to the procedure B3 as the complex-valued modulation symbol sequence d.

In procedure B3, layer mapping is applied to the complex-valued symbol sequence d. In the layer mapping, the complex-valued symbol sequence d is divided into v complex-valued symbol sequences $x^{(h)}$. Here, the elements of the h-th complex-valued symbol sequence $x^{(h)}$ are denoted by $x^{(h)}(g)$. v indicates the number of layers for the PUSCH instance. g represents an integer from 0 to $M^{layer}_{symb}-1$. $M^{layer}_{symb}$ indicates the number of complex-valued modulation symbols for each complex-valued symbol sequence. For example, $M^{layer}_{symb}$ may be determined by $M^{layer}_{symb}/v$. h represents an integer from 0 to v−1. For example, in a case that v=2, values of d(2g) may be input to elements $x^{(0)}(g)$ of the zeroth complex-valued symbol sequence. In a case that v=2, values of d(2g+1) may be input to elements $x^{(1)}(g)$ of the first complex-valued symbol sequence.

In the procedure B3, for example, in a case that v=1, the layer mapping need not be applied. In a case that the layer mapping is not applied in the procedure B3, the complex-valued symbol sequence d, which is input information of the procedure B3, may be input to the procedure B4 as the zeroth complex-valued symbol sequence $x^{(0)}$.

In the procedure B4, the transform precoding is applied to the complex-valued symbol sequence $x_{(h)}$. In the transform precoding, the complex-valued symbol sequence $x^{(h)}$ is transformed into $y^{(h)}$. Here, the transform precoding of the procedure B4 corresponds to Discrete Fourier Transform (DFT) on the complex-valued symbol sequence $x^{(h)}$.

In a case that the transform precoding is not applied in the procedure B4, the h-th complex-valued modulation symbol $x^{(h)}$, which is input information of the procedure B4, may be input to the procedure B5 as the h-th complex-valued modulation symbol $y^{(h)}$. For example, in a case that a signal waveform applied to the PUSCH instance is CP-OFDM, the CP-OFDM need not be applied in the procedure B4.

In the procedure B5, the precoding is applied to the complex-valued symbol sequence $y^{(h)}$. In the precoding, the elements $z^{(p)}(g)$ of the p-th complex-valued symbol sequence $z^{(p)}$ are generated by $[z^{(0)}(g), z^{(1)}(g), \ldots z^{(p)}(g), \ldots, z^{(P-1)}(g)]^T = W \cdot [y^{(0)}(g), y^{(1)}(g), \ldots y^{(h)}(g), \ldots, y^{(v-1)}(g)]^T$. Here, p represents an integer from 0 to P−1. P represents the number of the p-th complex-valued symbol sequence $z^{(p)}$. P is also referred to as the number of antenna ports. W is a P×v matrix. W is also referred to as a precoding matrix. [A, B, . . . , C] represents a row vector including at least row vectors A, B, and C. $[\ ]^T$ indicates transposition of the row vector.

In a case that the precoding is not applied in the procedure B5, the h-th complex-valued symbol sequence $y^{(h)}$, which is input information of the procedure B5, may be input to the procedure B6 as the p-th complex-valued symbol sequence $z^{(p)}$. For example, h=p may be satisfied. For example, in a case that W=1 is configured, the precoding need not be applied in the procedure B5.

FIG. 10 is a diagram illustrating an example of symbol mapping to VRB according to an aspect of the present embodiment. In FIG. 10, the horizontal axis represents the OFDM symbol index $l_{sym}$, and the vertical axis represents the subcarrier index $k^a_{sc}$. Here, $k^a_{sc}$ indicates a subcarrier index in a domain of the VRB. Each of the blocks illustrated in FIG. 10 indicates a resource element. In the symbol mapping to the VRB of the procedure B6, a column vector $[z^{(0)}(g), z^{(1)}(g), \ldots, z^{(p)}(g), \ldots, z^{(P-1)}(g)]^T$ of the g-th elements of the complex-valued symbol sequence $z^{(p)}$ may be mapped to one of the resource elements included in the VRB assigned to the PUSCH instance. In the symbol mapping to the VRB, the column vector z $[z^{(0)}(g), z^{(1)}(g), \ldots z^{(p)}(g), \ldots, z^{(P-1)}(g)]^T$ of the elements of the complex-valued symbol sequence $z^{(p)}$ may be mapped to resource elements based on subcarrier index $k^a_{sc}$ priority.

In the procedure B7, mapping from the VRB to the PRB may be performed. After the VRB is mapped to the PRB, the column vector z $[z^{(0)}(g), z^{(1)}(g), \ldots z^{(p)}(g), \ldots, z^{(P-1)}(g)]^T$ of the elements of the complex-valued symbol sequence $z^{(p)}$ mapped to the OFDM symbol index $l_{sym}$ of the subcarrier index $k_{sc}$ is stored in $a(k_{sc}, l_{sym})$. Here, $a(k_{sc}, l_{sym})$ is also referred to as a content (or value) of the OFDM symbol index $l_{sym}$ of the subcarrier index $k_{sc}$.

In the procedure B8, the baseband signal $s_{lsym}(t)$ is generated based at least on the content $a(k_{sc}, l_{sym})$ of the OFDM symbol index $l_{sym}$ of the subcarrier index $k_{sc}$. The baseband signal generation in the procedure B8 corresponds to the Inverse Fast Fourier Transform (IFFT) on the content $a(k_{sc}, l_{sym})$.

The baseband signal $s_{lsym}(t)$ generated in the procedure B8 is input to the RF circuitry 12. In the RF circuitry 12, the signal power is amplified by a power amplifier, and the signal is transmitted from the antenna circuitry 11.

The base station apparatus 3 receives the PUSCH instance of the terminal apparatus 1. The baseband circuitry 33 of the base station apparatus 3 may perform the baseband processing on the uplink data for each PUSCH instance. Here, the baseband signal generation of the uplink data by the baseband circuitry 33 includes at least a part or all of the following procedures B1 to B8.

Procedure C1) Content estimation
Procedure C2) Mapping from PRB to VRB
Procedure C3) Generation of received symbol sequence
Procedure C4) Inverse operation of precoding
Procedure C5) Inverse operation of transform precoding
Procedure C6) Layer demapping
Procedure C7) Demodulation processing
Procedure C8) Descrambling In the procedure C1, a content estimation is applied to the baseband signal $r_{lsym}(t)$ input from the RF circuitry 32. In the content estimation, an estimate $r(k_{sc}, l_{sym})$ of the content for each resource element is acquired by applying a Fast Fourier Transform (FFT) to the baseband signal $r_{lsym}(t)$. Here, the FFT corresponds to an inverse operation of the IFFT of the procedure B8. In addition, $r(k_{sc}, l_{sym})$ is an estimate of the content of the OFDM symbol index $l_{sym}$ of the subcarrier index $k_{sc}$.

In the procedure C2, mapping from PRB to VRB is applied to the estimate $r(k_{sc}, l_{sym})$ of the content. The mapping from PRB to VRB corresponds to the inverse operation of the mapping from VRB to PRB in the procedure B7.

In the procedure C3, estimation of a received symbol sequence is applied based at least on the estimate $r(k_{sc}, l_{sym})$ of the content mapped to the VRB. First, in the estimation of the received symbol sequence, the estimate of the content mapped to each resource element is acquired based on the subcarrier index $k^a_{sc}$ priority. The column vector of the elements of the complex-valued symbol sequence $z^{(q)}_{r,a}$ after the acquisition is denoted by $[z^{(0)}_{r,a}(g), z^{(1)}_{r,a}(g), \ldots z^{(q)}_{r,a}(g), \ldots, z^{(Q-1)}_{r,a}(g)]^T$.

In addition, in the procedure C3, a phase correction is performed on the column vector $[z^{(0)}_{r,a}(g), z^{(1)}_{r,a}(g), \ldots z^{(q)}_{r,a}(g), \ldots, z^{(Q-1)}_{r,a}(g)]^T$ of the elements of the complex-valued symbol sequence $z^{(q)}_{r,a}$. Here, the phase correction is processing of multiplying the column vector $[z^{(0)}_{r,a}(g), z^{(1)}_{r,a}(g), \ldots z^{(q)}_{r,a}(g), \ldots, z^{(Q-1)}_{r,a}(g)]^T$ of the elements of the complex-valued symbol sequence $z^{(q)}_{r,a}$ by a matrix V. Here, the matrix V is determined based at least on a channel estimate matrix $H_r$. The channel estimate matrix $H_r$ is an estimate of a channel matrix H. Here, the channel matrix H indicates a variation in phase/amplitude of the propagation path from each of the transmission antenna ports of the terminal apparatus 1 to the corresponding one of the reception antenna ports of the base station apparatus 3. Here, the variation in phase/amplitude of the propagation path also includes a variation in phase/amplitude due to processing (for example, processing in the power amplifier) of the RF circuitry 12. The channel matrix H is a P×Q matrix. The matrix V is a Q×P matrix.

By multiplying the column vector $[z^{(0)}_{r,a}(g), z^{(1)}_{r,a}(g), \ldots, z^{(q)}_{r,a}(g), \ldots, z^{(Q-1)}_{r,a}(g)]^T$ of the elements of the complex-valued symbol sequence $z^{(q)}_{r,a}$ by the matrix V, the column vector $[z^{(0)}_r(g), z^{(1)}_r(g), \ldots z^{(p)}_r(g), \ldots, z^{(Q-1)}_r(g)]^T$ of the elements of the complex-valued symbol sequence $z^{(p)}_r$ is generated. Here, the column vector $[z^{(0)}_r(g), z^{(1)}_r(g), \ldots z^{(p)}_r(g), \ldots, z^{(Q-1)}_r(g)]^T$ of the elements of the complex-valued symbol sequence $z^{(p)}_r$ is an estimate of the column vector $[z^{(0)}(g), z^{(1)}(g), \ldots z^{(p)}(g), \ldots, z^{(Q-1)}(g)]^T$ of the elements of the complex-valued symbol sequence $z^{(p)}$.

In the procedure C4, the inverse operation of the precoding is applied to the column vector $[z^{(0)}_r(g), z^{(1)}_r(g), \ldots z^{(p)}_r(g), \ldots, z^{(Q-1)}_r(g)]^T$ of the elements of the complex-valued symbol sequence $z^{(p)}_r$. In the inverse operation of the precoding, by multiplying the column vector $[z^{(0)}_r(g), z^{(1)}_r(g), \ldots z^{(p)}_r(g), \ldots, z^{(Q-1)}_r(g)]^T$ of the elements of the complex-valued symbol sequence $z^{(p)}_r$ by an inverse matrix of the precoding matrix W, the column vector $[y^{(0)}{}_r(g), y^{(1)}{}_r(g), \ldots y^{(h)}{}_r(g), \ldots, y^{(v-1)}{}_r(g)]^T$ of the elements of the complex-valued symbol sequence $y^{(h)}{}_r$ is generated. Here, the column vector $[y^{(0)}{}_r(g), y^{(1)}{}_r(g), \ldots y^{(h)}{}_r(g), \ldots, y^{(v-1)}{}_r(g)]^T$ of the elements of the complex-valued symbol sequence $y^{(h)}{}_r$ is an estimate of the column vector $[y^{(0)}(g), y^{(1)}(g), \ldots y^{(h)}(g), \ldots, y^{(v-1)}(g)]^T$ of the elements of the complex-valued symbol sequence $y^{(h)}$.

In the procedure C4, in a case that the inverse operation of the precoding is not applied, the column vector $[z^{(0)}{}_r(g), z^{(1)}{}_r(g), \ldots z^{(p)}{}_r(g), \ldots, z^{(Q-1)}{}_r(g)]^T$ of the elements of the complex-valued symbol sequence $z^{(p)}{}_r$ is input to the procedure C5 as the column vector $[y^{(0)}{}_r(g), y^{(1)}{}_r(g), \ldots y^{(h)}{}_r(g), \ldots, y^{(v-1)}{}_r(g)]^T$ of the elements of the complex-valued symbol sequence $y^{(h)}{}_r$. For example, in a case that the precoding is not applied in the procedure B5 of the baseband circuitry 13, the inverse operation of the precoding need not be applied in the procedure C4 of the base station apparatus 33.

In the procedure C5, the inverse operation of the transform precoding is applied to the complex-valued symbol sequence $y^{(h)}{}_r$. In the inverse operation of the transform precoding, the complex-valued symbol sequence $y^{(h)}{}_r$ is transformed into $x^{(h)}{}_r$. The complex-valued symbol sequence $x^{(h)}{}_r$ is an estimate of the complex-valued symbol sequence $x^{(h)}$. Here, in a case that the transform precoding is not applied in the procedure B4 of the baseband circuitry 13, the inverse operation of the transform precoding need not be applied in the procedure C5 of the baseband circuitry 33. Here, the inverse operation of the transform precoding in the procedure C5 corresponds to an Inverse Discrete Fourier Transform (IDFT) on the complex-valued symbol sequence $y^{(h)}{}_r$.

In a case that the inverse operation of the transform precoding is not applied to the complex-valued symbol sequence $y^{(h)}{}_r$ in the procedure C5, $y^{(h)}{}_r$, which is the input information of the procedure C5, may be input to the procedure C6 as $x^{(h)}{}_r$.

In the procedure C6, layer demapping is applied to the complex-valued symbol sequence $x^{(h)}$. In the layer demapping, v complex-valued symbol sequences $x^{(h)}$ are combined into one sequence. The complex-valued symbol sequence $d_r$ combined in the layer demapping is an estimate of the complex-valued symbol sequence d.

In a case that the layer mapping is not applied in the procedure B3 of the baseband circuitry 13, the layer demapping need not be applied in the procedure C6 of the baseband circuitry 33. In a case that the layer demapping is not applied in the procedure C6, the complex-valued symbol sequence $x^{(h)}$ may be input to the procedure C7 as the complex-valued symbol sequence dr.

In the procedure C7, demodulation processing is applied to the complex-valued symbol sequence $d_r$. For example, in the demodulation processing, a Log likelihood Ratio (LLR) may be calculated based at least on the complex-valued symbol sequence $d_r$. The calculated sequence $b^a{}_r$ is an estimate of the complex-valued symbol sequence $b_a$.

In a case that the demodulation processing is not applied to the complex-valued symbol sequence dr in the procedure C7, the complex-valued symbol sequence $d_r$ may be input to the procedure C8 as the sequence $b^a{}_r$.

In the procedure C8, descrambling is applied to the sequence $b^a{}_r$. In the descrambling, the sequence $b_r$ is calculated based at least on the sequence $b^a{}_r$ and the bit sequence c. The sequence $b_r$ is an estimate of the bit sequence b.

The uplink data is extracted by applying the decoding processing of the baseband circuitry 33 to the sequence $b_r$.

The DMRS related to the PUSCH instance is used to obtain the channel estimate matrix $H_r$. For example, the DMRS related to the PUSCH instance 9001 is used to obtain the channel estimate matrix $H_r$ for the PUSCH instance 9001. In addition, the DMRS related to the PUSCH instance 9002 is used to obtain the channel estimate matrix $H_r$ for the PUSCH instance 9002.

By using the DMRS related to each of the PUSCH instances for obtaining the channel estimate matrix $H_r$ for the PUSCH instance 9001, an improvement in estimation accuracy of the channel estimate matrix $H_r$ is expected.

For example, in order to use the DMRS related to the PUSCH instance 9002 and the DMRS related to the PUSCH instance 9002 to obtain the channel estimate matrix $H_r$ for the PUSCH instance 9001, the variation in phase/amplitude due to the processing of the RF circuitry 12 on the PUSCH instance 9001 is not to be substantially different from the variation in phase/amplitude due to the processing of the RF circuitry on the PUSCH instance 9002. Here, the fact that the variation in phase due to the processing of the RF circuitry 12 on the PUSCH instance 9001 is not substantially different from the variation in phase due to the processing of the RF circuitry on the PUSCH instance 9002 is a state in which Phase continuity is maintained. In addition, the fact that the variation in amplitude due to the processing of the RF circuitry 12 on the PUSCH instance 9001 is not substantially different from the variation in amplitude due to the processing of the RF circuitry on the PUSCH instance 9002 is a state in which Power consistency is maintained.

The power amplifier is one of the causes of the RF circuitry 12 that affects the phase continuity and/or the power consistency. In order to maintain the phase continuity and/or the power consistency, it is desirable to keep the transmission power configuration constant in the PUSCH instance 9001 and the PUSCH 9002.

For example, the terminal apparatus 1 may recognize that the transmission power configuration is constant in the certain duration 9000. In addition, the terminal apparatus 1 may maintain the phase continuity and/or the power consistency of each of the PUSCH instances included in the certain duration 9000 based on the transmission power configuration being constant in the certain duration 9000.

For example, the base station apparatus 3 may use at least a part or all of the DMRS related to the PUSCH instance 9001, the DMRS related to the PUSCH instance 9002, the DMRS related to the PUSCH instance 9003, the DMRS related to the PUSCH instance 9004, and the DMRS related to the PUSCH instance 9005 for the baseband processing on the PUSCH instance 9001, based at least on recognition that the phase continuity and/or the power consistency of each of the PUSCH instance included in the certain duration 9000 are maintained.

Figure 16:
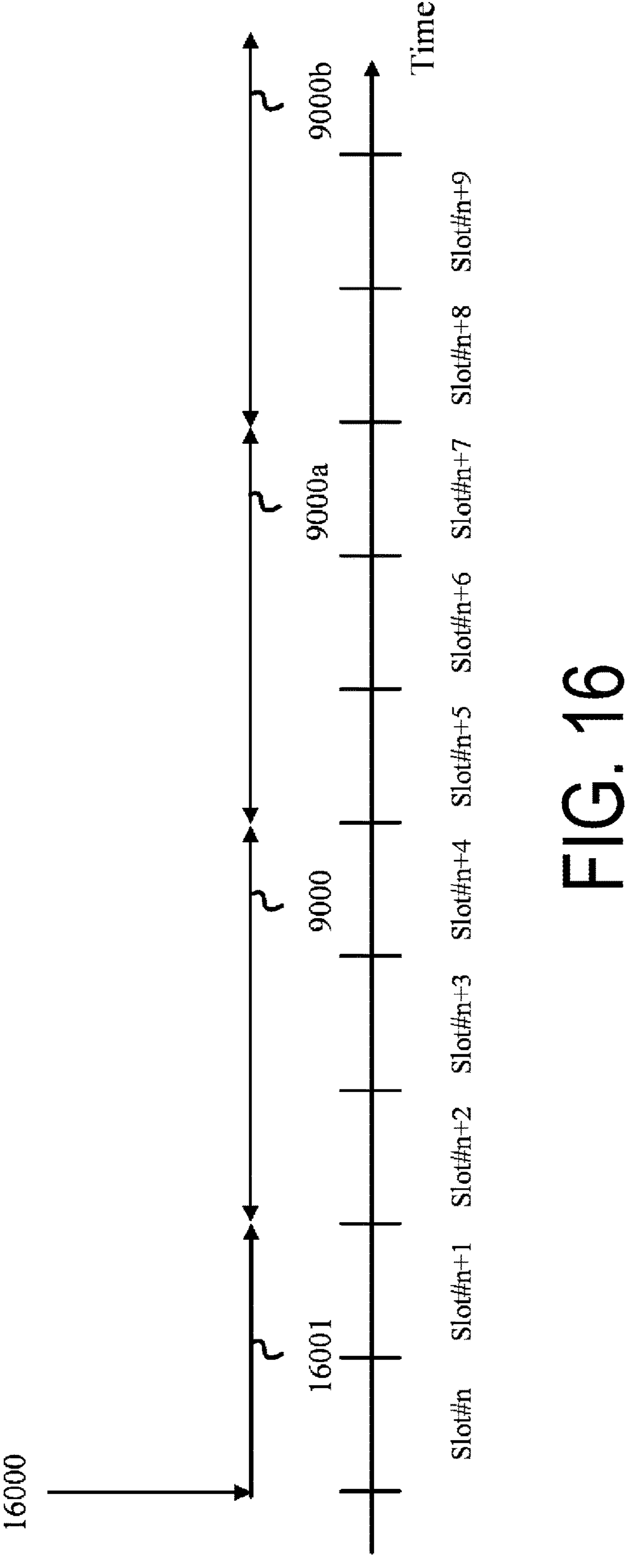
FIG. 16 is a diagram illustrating an example of configuration of a certain duration 9000 according to an aspect of the present embodiment.

FIG. 16 is a diagram illustrating a configuration example of the certain duration 9000 according to an aspect of the present embodiment. In FIG. 16, the horizontal axis represents a time axis. A grid on the horizontal axis indicates a boundary between slots. Slot indices are assigned to the respective slots in ascending order. A reference numeral 16000 indicates a Reference point. A reference numeral 16001 indicates an offset from the reference point to the head of the certain duration 9000.

As illustrated in FIG. 16, a position of the certain duration 9000 may be determined based at least on an offset 16001 from a reference point 16000. The determined certain duration 9000 may be periodically configured. As illustrated in FIG. 16, a certain duration 9000*a* may be configured to start from the end of the certain duration 9000. A certain duration 9000*b* may be configured to start from the end of the certain duration 9000*a*.

For example, the cycle of the certain duration 9000 may be provided from the higher layer parameter. For example, in a case that the cycle of the certain duration 9000 is X, the certain duration 9000*a* may be started after X from the start of the certain duration 9000.

The length of the certain duration 9000 may be provided by a higher layer parameter.

Here, the certain duration 9000, the certain duration 9000*a*, and the certain duration 9000*b* are also collectively referred to as a certain duration 9000.

Figure 11:
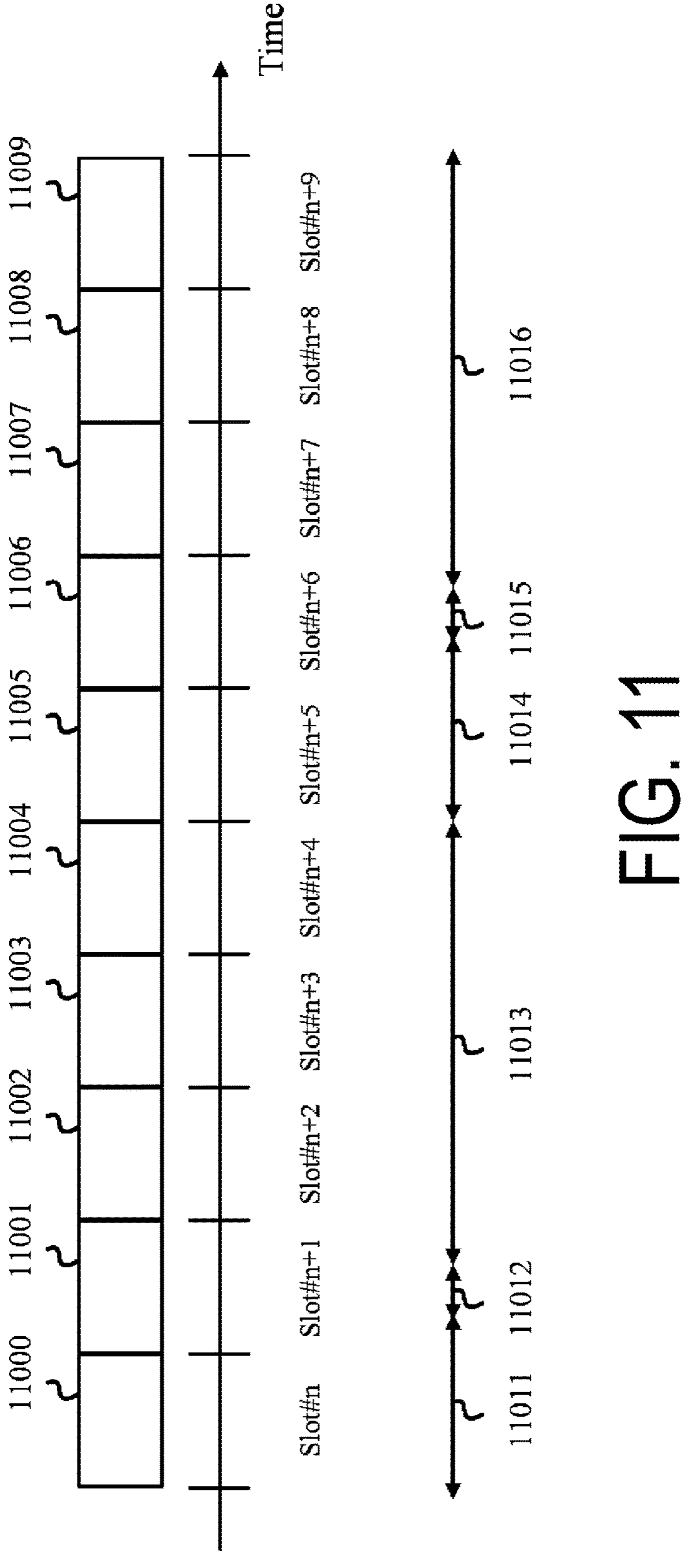
FIG. 11 is a diagram illustrating an example of a first repetition type of PUSCH transmission according to an aspect of the present embodiment.

FIG. 11 is a diagram illustrating an example of a first repetition type of PUSCH transmission according to an aspect of the present embodiment. In FIG. 11, the horizontal axis represents a time axis. A grid on the horizontal axis indicates a boundary between slots. Slot indices are assigned to the respective slots in ascending order. Each of the PUSCH instances 11000 to 11009 is mapped to one of the slots. Here, the number of repetitions of the PUSCH is 10. Each of the PUSCH instances includes a resource from the head of a slot to the end of the slot. Durations indicated by 11011 and 11014 are downlink regions. Durations indicated by 11012 and 11015 are flexible regions. Durations indicated by 11013 and 11016 are uplink regions. A configuration including at least the durations 11011, 11012, 11013, 11014, 11015, and 11016 is also referred to as a TDD pattern configuration. The TDD pattern configuration is a configuration on the time domain configured based at least on a part or all of the downlink, the flexible region, and the uplink. For example, the TDD pattern configuration may be configured for a terminal apparatus connected to a cell operated in TDD. The TDD pattern configuration may be configured for a terminal apparatus that does not support Full duplex communication in a certain cell.

In the first repetition type of the PUSCH, whether the PUSCH instance is transmitted is determined based at least on the TDD pattern configuration. For example, in the first repetition type of the PUSCH, in a case that at least a part of the time domain resource of the PUSCH instance is included in the downlink region, the transmission of the PUSCH instance may be canceled. In addition, in a case that all the time domain resources of the PUSCH instance are not included in the downlink region, the PUSCH instance may be transmitted.

In the first repetition type of PUSCH, each of the PUSCH instances may be mapped to a different slot. In the first repetition type of the PUSCH, a time domain resource of a certain PUSCH is determined based at least on time domain resource assignment information. The time domain resource assignment information indicates one or both of a first OFDM symbol index of the PUSCH instance and the number of OFDM symbols of the PUSCH instance. The time domain resource assignment information, that is, in the first repetition type of the PUSCH, each of the PUSCH instances may be started from the same OFDM symbol index. In addition, each of the PUSCH instances may include the same number of OFDM symbols.

For example, in FIG. 11, the certain duration 9000 may be configured as a duration from slot #n to slot #n+9. On the other hand, the PUSCH instances 11000, 11001, 11005, and 11006 need not be transmitted according to conditions based on the TDD pattern configuration. Here, the terminal apparatus 1 may satisfy the phase continuity and/or the power consistency of the PUSCH instances 11002, 11003, 11004, 11007, 11008, and 11009.

Here, the terminal apparatus 1 may at least monitor the downlink signal (for example, PDCCH, SS/PBCH block, or CSI-RS) in the slot #n+5. In a case that the terminal apparatus 1 monitors the downlink signal in the slot #n+5, the configuration of the RF circuitry 12 of the terminal apparatus 1 may be changed. If the configuration of the RF circuitry 12 is changed, it may be difficult for the terminal apparatus 1 to satisfy the phase continuity and/or the power consistency of the PUSCH instances 11002, 11003, 11004, 11007, 11008, and 11009.

Thus, in a case that the TDD pattern configuration is provided to the terminal apparatus 1, the certain duration 9000 may be used to determine one or more sub-durations. For example, the terminal apparatus 1 may determine the one or more sub-durations based at least on the TDD pattern configuration. For example, the one or more sub-durations may be determined to be a continuous duration not including the downlink region in the certain duration 9000. For example, the one or more sub-durations may be determined to be a continuous duration configured by the uplink region and the flexible region in the certain duration 9000.

For example, a first sub-duration in FIG. 11 may be a duration including the duration 11012 and the duration 11013. A second sub-duration in FIG. 11 may be a duration including the duration 11015 and the duration 11016.

For example, one or more sub-durations may be determined to be a duration in which the PUSCH instance is transmitted among continuous durations not including the downlink region in the certain duration 9000. For example, one or more sub-durations may be determined to be a duration in which the PUSCH instance is transmitted among continuous durations configured by the uplink region and the flexible region in the certain duration 9000.

For example, the first sub-duration in FIG. 11 may be a duration including the PUSCH instance 11002, the PUSCH instance 11003, and the PUSCH instance 11004. The second sub-duration in FIG. 11 may be a duration including the PUSCH instance 11007, the PUSCH instance 11008, and the PUSCH instance 11009.

For example, the terminal apparatus 1 may maintain the phase continuity and/or the power consistency for each sub-duration. For example, the terminal apparatus 1 may maintain the phase continuity and/or the power consistency of one or more PUSCH instances included in a certain sub-duration. In addition, the terminal apparatus 1 may maintain the phase continuity and/or the power consistency of one or more PUSCH instances included in a different sub-duration. In addition, the terminal apparatus 1 need not maintain the phase continuity and/or the power consistency between the PUSCH instance included in the certain sub-duration and the PUSCH instance included in the different sub-duration.

In a case that frequency hopping is configured for the PUSCH transmission, the sub-duration may be a unit of the frequency hopping. For example, the terminal apparatus 1 may transmit one or more PUSCH instances included in a certain sub-duration in a first frequency band and transmit one or more PUSCH instances included in a different sub-duration in a second frequency band. Here, the first frequency band may be different from the second frequency band. For example, the terminal apparatus 1 may determine, based at least on that one or more PUSCH instances included in a certain sub-duration is transmitted in the first frequency band, the second frequency band that is the transmission band of one or more PUSCH instances included in a sub-duration next to the certain duration. For example, the base station apparatus 3 may determine, based at least on that one or more PUSCH instances included in a certain sub-duration is transmitted in the first frequency band, the second frequency band that is the transmission band of one or more PUSCH instances included in a sub-duration next to the certain duration.

Figure 12:
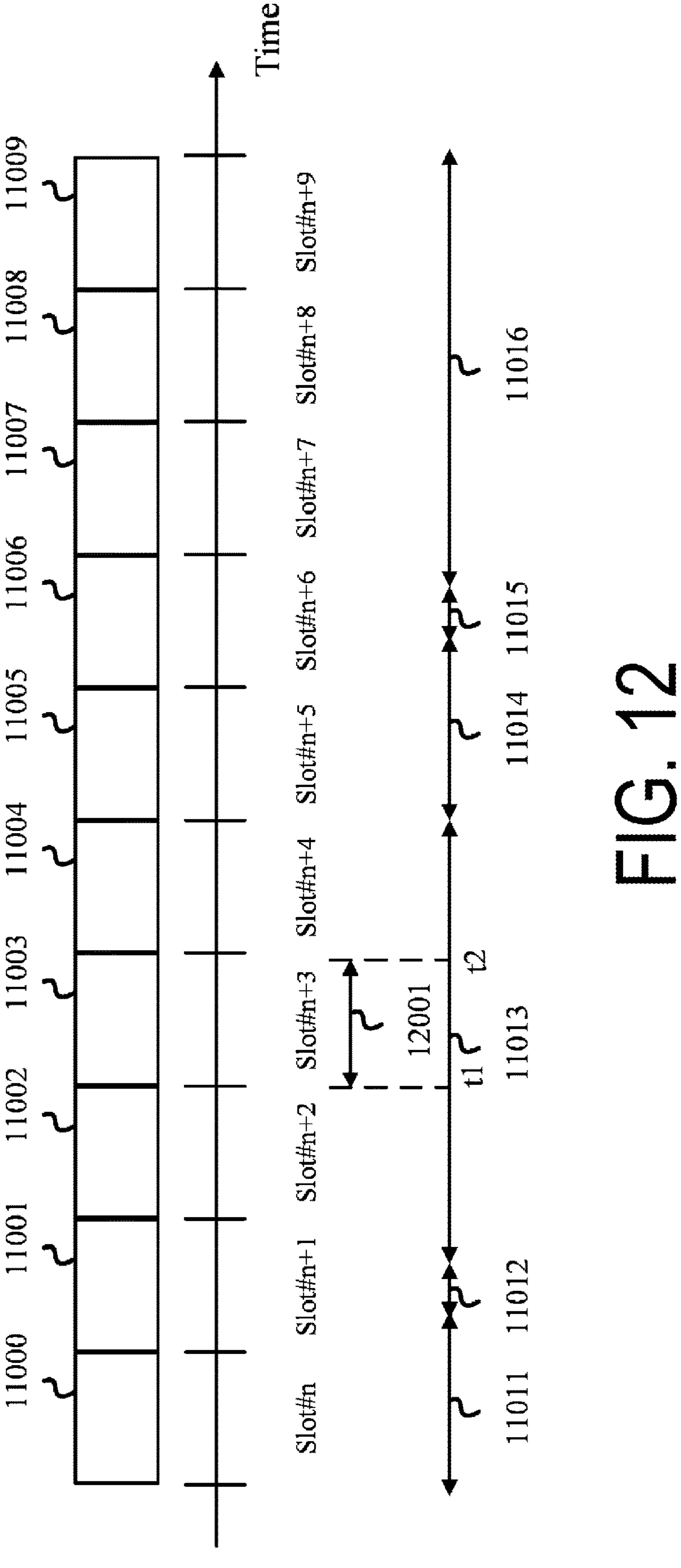
FIG. 12 is a diagram illustrating an example of a first repetition type of PUSCH according to an aspect of the present embodiment.

FIG. 12 is a diagram illustrating an example of the first repetition type of the PUSCH according to an aspect of the present embodiment. In FIG. 12, a reference numeral 12001 indicates a duration in which the transmission of the PUSCH is canceled. Here, a start time t1 of the duration 12001 matches the head of the slot #n+3. An end time t2 of the duration 12001 matches the end of the slot #n+3. For example, the duration 12001 may be determined based at least on the DCI format. For example, the DCI format used to determine the duration in which the transmission of the PUSCH is canceled may be different from the DCI format used to schedule the PUSCH. In addition, the DCI format used to determine the duration in which the transmission of the PUSCH is canceled may be the DCI format used to schedule the PUSCH. Here, the duration in which the transmission of the PUSCH is canceled is also referred to as an uplink cancellation domain.

The DCI format may indicate a time-frequency resource in which the transmission of the PUSCH instance is to be canceled. In a case that at least a part of a certain OFDM symbol of the PUSCH instance overlaps the time-frequency resource, transmission of the certain OFDM symbol of the PUSCH instance may be canceled. In addition, in a case that a different OFDM symbol of the PUSCH instance does not overlap the time-frequency resource, transmission of the different OFDM symbol of the PUSCH instance need not be canceled.

For example, the terminal apparatus 1 may cancel a part or all of the transmission of the PUSCH instance based at least on the duration in which the transmission of the PUSCH is canceled. For example, the terminal apparatus 1 may determine one or more sub-durations based at least on the duration in which the transmission of the PUSCH is canceled.

For example, the first sub-duration in FIG. 12 may be a duration including the duration 11012 and a duration from the head of the duration 11013 to the time t1. The second sub-duration in FIG. 12 may be a duration including a duration from the time t2 to the end of the duration 11013. Furthermore, the third sub-duration in FIG. 12 may be a duration including the duration 11015 and the duration 11016.

For example, the first sub-duration in FIG. 12 may be a duration including the PUSCH instance 11002. The second sub-duration in FIG. 12 may be a duration including the PUSCH instance 11004. Furthermore, the third sub-duration in FIG. 12 may be a duration including the PUSCH instance 11007, the PUSCH instance 11008, and the PUSCH instance 11009.

For example, the terminal apparatus 1 may maintain the phase continuity and/or the power consistency for each sub-duration. For example, the terminal apparatus 1 may maintain the phase continuity and/or the power consistency of the PUSCH 11007, the PUSCH instance 11008, and the PUSCH instance 11009 included in the third sub-duration.

On the other hand, the terminal apparatus 1 need not maintain the phase continuity and/or the power consistency between the PUSCH instance included in the first sub-duration and the PUSCH instances included in the third sub-duration. The terminal apparatus 1 need not maintain the phase continuity and/or the power consistency between the PUSCH instance included in the second sub-duration and the PUSCH instances included in the third sub-duration.

On the other hand, the terminal apparatus 1 may maintain the phase continuity and/or the power consistency between the PUSCH instance included in the first sub-duration and the PUSCH instance included in the second sub-duration. That is, in a case that a certain sub-duration and a different sub-duration are specified by a duration in which the transmission of the PUSCH is canceled, the terminal apparatus 1 may maintain the phase continuity and/or the power consistency between the PUSCH instance included in the certain sub-duration and the PUSCH instance included in the different sub-duration.

For example, in the first repetition type of the PUSCH, as illustrated in FIG. 12, in a case that the time domain resource of the PUSCH instance is continuously repeated, the phase continuity and/or the power consistency between the PUSCH instance included in the first sub-duration and the PUSCH instance included in the second sub-duration may be maintained.

Figure 13:
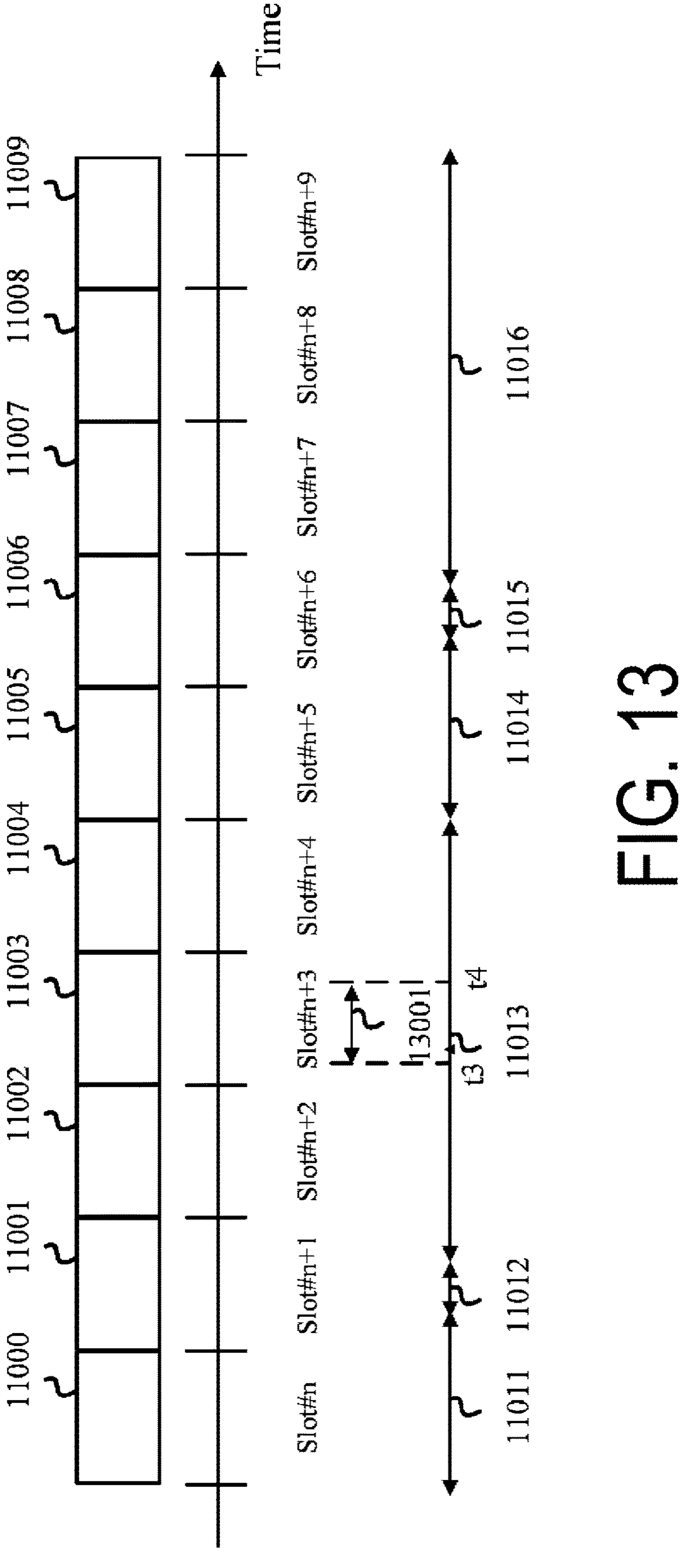
FIG. 13 is a diagram illustrating an example of a first repetition type of PUSCH according to an aspect of the present embodiment.

FIG. 13 is a diagram illustrating an example of the first repetition type of the PUSCH according to an aspect of the present embodiment. In FIG. 13, a reference numeral 13001 indicates a duration in which the transmission of the PUSCH is canceled. Here, a start time t3 of the duration 13001 falls within a range of the slot #n+3 but is positioned after the head of the slot #n+3. Furthermore, an end time t4 of the duration 13001 falls within the range of the slot #n+3 but is positioned before the end of the slot #n+3. For example, the duration 13001 may be determined based at least on the DCI format. For example, the DCI format used to determine the duration in which the transmission of the PUSCH is canceled may be different from the DCI format used to schedule the PUSCH. In addition, the DCI format used to determine the duration in which the transmission of the PUSCH is canceled may be the DCI format used to schedule the PUSCH.

For example, the first sub-duration in FIG. 13 may be a duration including the duration 11012 and a duration from the head of the duration 11013 to the time t3. The second sub-duration in FIG. 13 may a duration including a duration from the time t4 to the end of the duration 11013. The third sub-duration in FIG. 13 may a duration including the duration 11015 and the duration 11016.

For example, the first sub-duration in FIG. 13 may be a duration including the PUSCH instance 11002 and a duration from the head of the PUSCH instance 11013 to the time t3. The second sub-duration in FIG. 13 may be a duration including a duration from the time t4 to the end of the PUSCH instance 11013 and the PUSCH instance 11004. The third sub-duration in FIG. 13 may be a duration including the PUSCH instance 11007, the PUSCH instance 11008, and the PUSCH instance 11009.

For example, the terminal apparatus 1 may maintain the phase continuity and/or the power consistency for each sub-duration. For example, the terminal apparatus 1 may maintain the phase continuity and/or the power consistency between the PUSCH instance 11002 included in the first sub-duration and a duration from the head of the PUSCH instance 11003 to the time t3. The terminal apparatus 1 may maintain the phase continuity and/or the power consistency between a duration from the time t4 to the end of the PUSCH instance 11003 included in the second sub-duration and the PUSCH instance 11004. The terminal apparatus 1 may maintain the phase continuity and/or the power consistency of the PUSCH 11007, the PUSCH instance 11008, and the PUSCH instance 11009 included in the third sub-duration.

On the other hand, the terminal apparatus 1 need not maintain the phase continuity and/or the power consistency between the PUSCH instance included in the first sub-duration and the PUSCH instances included in the third sub-duration. The terminal apparatus 1 need not maintain the phase continuity and/or the power consistency between the PUSCH instance included in the second sub-duration and the PUSCH instances included in the third sub-duration.

On the other hand, the terminal apparatus 1 may maintain the phase continuity and/or the power consistency between the PUSCH instance included in the first sub-duration and the PUSCH instance included in the second sub-duration. That is, in a case that a certain sub-duration and a different sub-duration are specified by a duration in which the transmission of the PUSCH is canceled, the terminal apparatus 1 may maintain the phase continuity and/or the power consistency between the PUSCH instance included in the certain sub-duration and the PUSCH instance included in the different sub-duration.

For example, in the first repetition type of the PUSCH, as illustrated in FIG. 13, in a case that the time domain resource of the PUSCH instance is continuously repeated, the phase continuity and/or the power consistency between the PUSCH instance included in the first sub-duration and the PUSCH instance included in the second sub-duration may be maintained.

Figure 14:
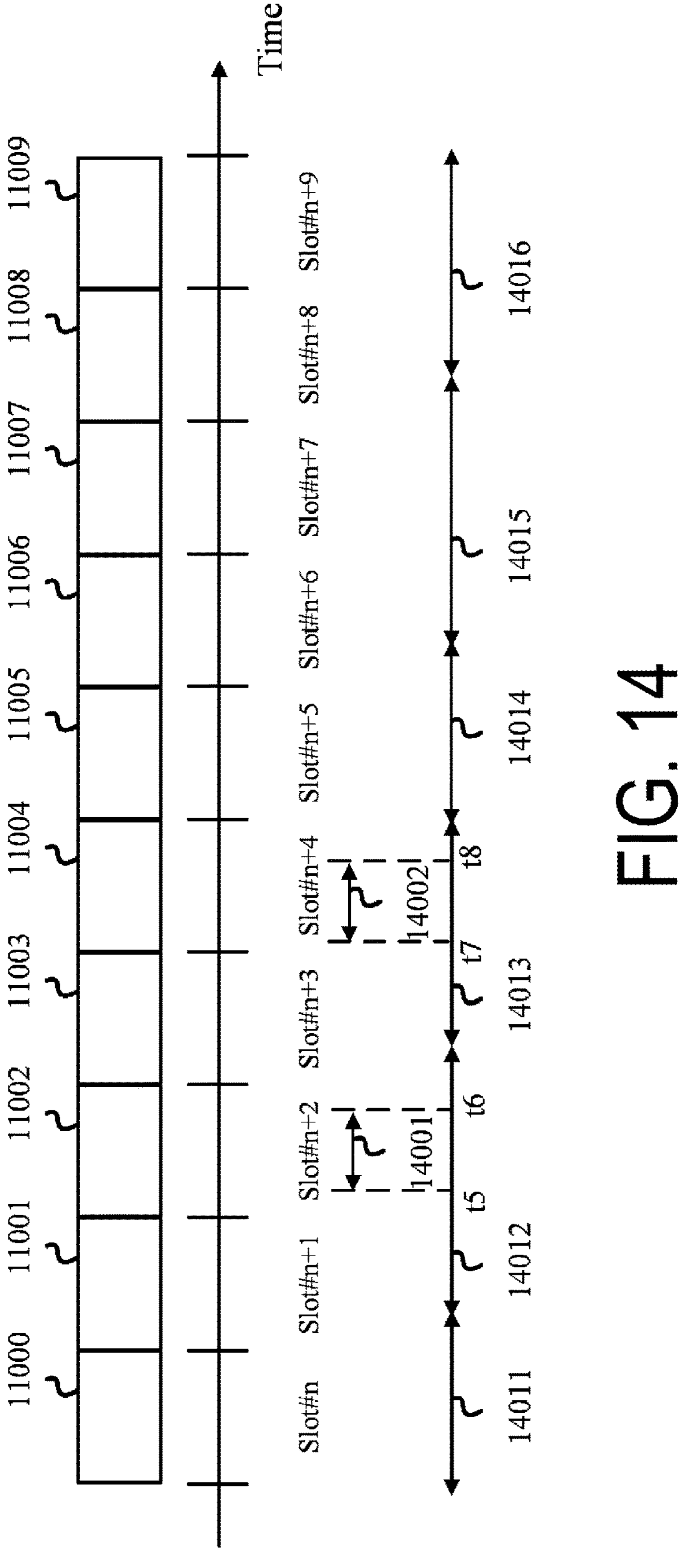
FIG. 14 is a diagram illustrating an example of a first repetition type of PUSCH according to an aspect of the present embodiment.

FIG. 14 is a diagram illustrating an example of the first repetition type of PUSCH according to an aspect of the present embodiment. In FIG. 14, durations indicated by 14011 and 14014 are downlink regions. Durations indicated by 14012 and 14015 are flexible regions. Durations indicated by 14013 and 14016 are uplink regions. A configuration including at least the durations 14011, 14012, 14013, 14014, 14015, and 14016 is also referred to as the TDD pattern configuration. In FIG. 14, reference numerals 14001 and 14002 indicate durations in which the transmission of the PUSCH is canceled. Here, a start time t5 of the duration 14001 falls within a range of the slot #n+2 but is positioned after the head of the slot #n+2. An end time t6 of the duration 14001 falls within the range of the slot #n+2 but is positioned before the end of the slot #n+2. A start time t7 of the duration 14002 falls within a range of the slot #n+4 but is positioned after the head of the slot #n+4. An end time t8 of the duration 14002 falls within the range of the slot #n+4 but is positioned before the end of the slot #n+4. For example, the duration 14001 may be determined based at least on the DCI format. The duration 14002 may be determined based at least on the DCI format. The DCI format used to determine the duration 14001 may be different from or the same as the DCI format used to determine the duration 14002.

For example, the first sub-duration in FIG. 14 may be a duration from the head of the duration 14012 to the time t5. The second sub-duration in FIG. 14 may be a duration from the time t6 to the time t7. The third sub-duration in FIG. 14 may be a duration from the time t8 to the end of the duration 14013. The fourth sub-duration in FIG. 14 may be a duration including the duration 14015 and the duration 14016.

For example, the fourth sub-duration in FIG. 14 may be a duration including the PUSCH instance 11007, the PUSCH instance 11008, and the PUSCH instance 11009.

For example, the terminal apparatus 1 may maintain the phase continuity and/or the power consistency for each sub-duration. For example, the terminal apparatus 1 may maintain the phase continuity and/or the power consistency among a duration from the time t6 to the end of the PUSCH instance 11002, the PUSCH instance 11003, and a duration from the head of the PUSCH instance 11004 to the time t7, included in the second sub-duration. The terminal apparatus 1 may maintain the phase continuity and/or the power consistency of the PUSCH 11007, the PUSCH instance 11008, and the PUSCH instance 11009 included in the fourth sub-duration.

On the other hand, the terminal apparatus 1 need not maintain the phase continuity and/or the power consistency between the PUSCH instance included in the first sub-duration and the PUSCH instances included in the fourth sub-duration. The terminal apparatus 1 need not maintain the phase continuity and/or the power consistency between the PUSCH instance included in the second sub-duration and the PUSCH instances included in the fourth sub-duration. The terminal apparatus 1 need not maintain the phase continuity and/or the power consistency between the PUSCH instance included in the third sub-duration and the PUSCH instances included in the fourth sub-duration.

On the other hand, the terminal apparatus 1 need not maintain the phase continuity and/or the power consistency between the PUSCH instance included in the first sub-duration and the PUSCH instance included in the second sub-duration. The terminal apparatus 1 need not maintain the phase continuity and/or the power consistency between the PUSCH instance included in the first sub-duration and the PUSCH instance included in the third sub-duration. That is, in a case that a certain sub-duration and a different sub-duration are specified by a duration in which the transmission of the PUSCH is canceled and that the duration in which the transmission of the PUSCH is canceled is mapped to the flexible region, the terminal apparatus 1 need not maintain the phase continuity and/or the power consistency between the PUSCH instance included in the certain sub-duration and the PUSCH instance included in the different sub-duration.

On the other hand, the terminal apparatus 1 may maintain the phase continuity and/or the power consistency between the PUSCH instance included in the second sub-duration and the PUSCH instance included in the third sub-duration. That is, in a case that a certain sub-duration and a different sub-duration are specified by a duration in which the transmission of the PUSCH is canceled and that the duration in which the transmission of the PUSCH is canceled is mapped to the uplink region, the terminal apparatus 1 may maintain the phase continuity and/or the power consistency between the PUSCH instance included in the certain sub-duration and the PUSCH instance included in the different sub-duration.

For example, in the first repetition type of the PUSCH, as illustrated in FIG. 14, in a case that the time domain resource of the PUSCH instance is continuously repeated, the phase continuity and/or the power consistency between the PUSCH instance included in the second sub-duration and the PUSCH instance included in the third sub-duration may be maintained.

For example, in the first repetition type of the PUSCH, the certain duration 9000 may be divided into a plurality of sub-durations based at least on a configuration of a domain in which the transmission of the PUSCH is canceled. In a case that a plurality of PUSCH instances are included in a certain sub-duration among the plurality of sub-durations, the terminal apparatus 1 may maintain the phase continuity and/or the power consistency of the plurality of PUSCH instances. For example, based at least on the fact that a configuration of a domain, which is included between a certain sub-duration and a different sub-duration and in which transmission of the PUSCH is canceled, includes a downlink region based on the TDD pattern configuration, the phase continuity and/or the power consistency between one or more PUSCH instances included in the certain sub-duration and one or more PUSCH instances included in the different sub-duration need not be maintained. On the other hand, based at least on the fact that a configuration of a domain, which is included between a certain sub-duration and a different sub-duration and in which transmission of the PUSCH is canceled, does not include the downlink region based on the TDD pattern configuration, the phase continuity and/or the power consistency between one or more PUSCH instances included in the certain sub-duration and one or more PUSCH instances included in the different sub-duration may be maintained.

Based at least on the fact that a configuration of a domain, which is included between a certain sub-duration and a different sub-duration and in which transmission of the PUSCH is canceled, includes an uplink cancellation domain, the phase continuity and/or the power consistency between one or more PUSCH instances included in the certain sub-duration and one or more PUSCH instances included in the different sub-duration may be maintained.

Based at least on the fact that a configuration of a domain, which is included between a certain sub-duration and a different sub-duration and in which transmission of the PUSCH is canceled, does not include at least a downlink region based on the TDD pattern configuration, that the transmission of the PUSCH is an uplink cancellation domain, and that the uplink cancellation domain is mapped to a flexible region, the phase continuity and/or the power consistency between one or more PUSCH instances included in the certain sub-duration and one or more PUSCH instances included in the different sub-duration need not be maintained.

Based at least on the fact that a configuration of a domain, which is included between a certain sub-duration and a different sub-duration and in which transmission of the PUSCH is canceled, does not include at least a downlink region based on the TDD pattern configuration, that the transmission of the PUSCH is an uplink cancellation domain, and that the uplink cancellation domain is mapped to an uplink region, the phase continuity and/or the power consistency between one or more PUSCH instances included in the certain sub-duration and one or more PUSCH instances included in the different sub-duration may be maintained.

Figure 15:
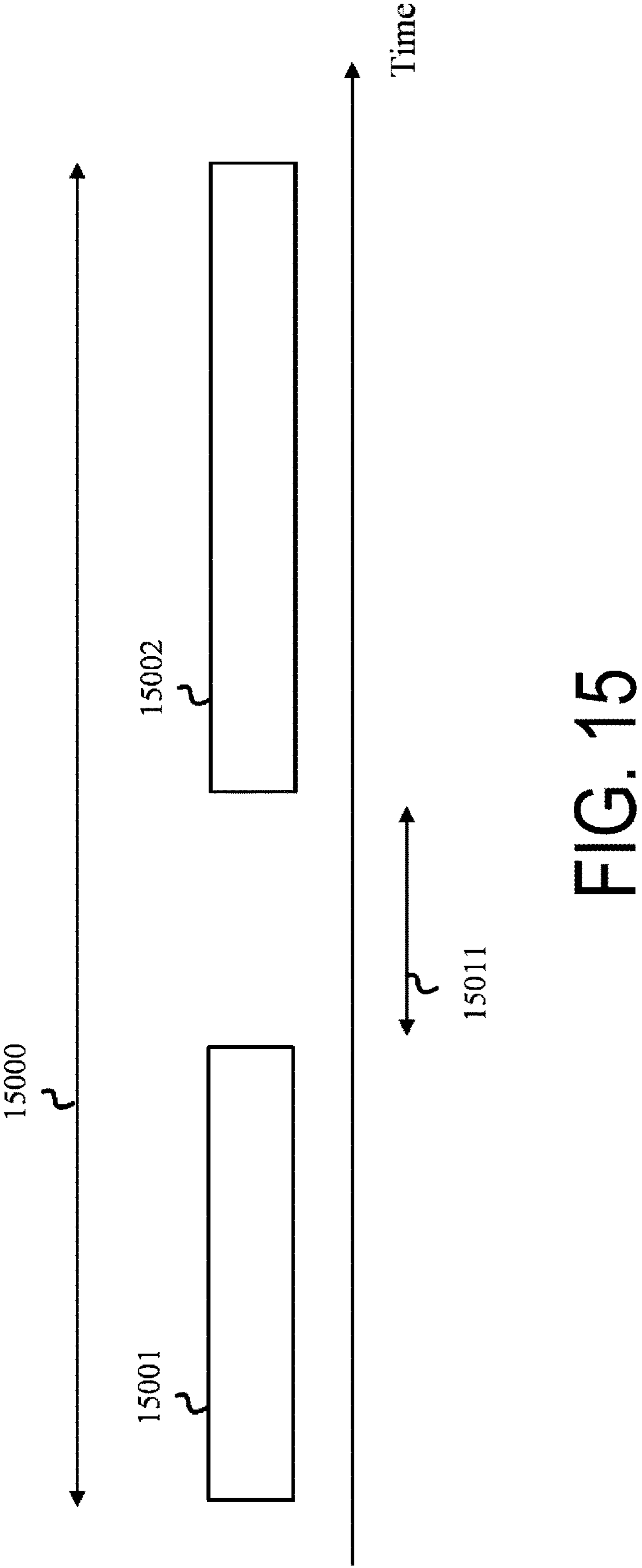
FIG. 15 is a diagram illustrating an example of a second repetition type of PUSCH according to an aspect of the present embodiment.

FIG. 15 is a diagram illustrating an example of a second repetition type of the PUSCH according to an aspect of the present embodiment. A reference numeral 15000 in FIG. 15 indicates a domain of a certain Nominal repetition. Here, the length of the nominal repetition is indicated by a time domain resource assignment field included in the uplink DCI format. A reference numeral 15011 illustrated in FIG. 15 indicates an Invalid duration for the second repetition type of the PUSCH. The invalid duration 15011 is at least used to determine Actual repetition of the PUSCH. Here, the actual repetition of one PUSCH corresponds to one PUSCH instance. In a case that the nominal repetition 15000 and the invalid duration 15011 overlap each other as illustrated in FIG. 15, actual repetition 15001 is configured as a duration from the head of the nominal repetition 15000 to the head of the invalid duration 15011. Actual repetition 15002 is configured as a duration from the end of the invalid duration 15011 to the end of the nominal repetition 15000.

The invalid duration may be configured based on at least one of the following I1, I2, I3, I4, or I5.

I1) Downlink region included in TDD pattern configuration

I2) Domain in which transmission of SS/PBCH block is configured

I3) Domain in which monitoring of Type 0 PDCCH common search space set is configured I4) Domain corresponding to switching time from downlink reception to uplink transmission I5) Domain indicating invalid duration The domain in which the transmission of the SS/PBCH block is configured may be determined based at least on bitmap information provided by the RRC parameter. The bitmap information may include a bitmap for SS/PBCH block candidates in a half radio frame. Each of the bits included in the bitmap may correspond to one SS/PBCH block candidate in the half frame. For example, in a case that a certain bit of the bitmap is set to 1, a domain of the SS/PBCH block candidate corresponding to the certain bit may be configured as the invalid duration. In a case that a certain bit of the bitmap is set to 0, a domain of the SS/PBCH block candidate corresponding to the certain bit need not be configured as the invalid duration.

The domain corresponding to the switching time from the downlink reception to the uplink transmission may be determined based at least on the number of OFDM symbols provided by the RRC parameter. For example, in a case that a value X is provided by the RRC parameter, a domain of X OFDM symbols from the OFDM symbol next to the end of the downlink region may be configured as the invalid duration. Furthermore, in a case that the value X is provided by the RRC parameter, a domain of X OFDM symbols from the OFDM symbol next to the end of the domain indicating the invalid duration may be configured as the invalid duration.

The domain indicating the invalid duration may be determined based at least on bitmap information provided by the RRC parameter. The bitmap information may include a bitmap of OFDM symbol level. Each of the bits of the bitmap may correspond to one OFDM symbol. For example, in a case that a certain bit of the bitmap is set to 1, a corresponding OFDM symbol in a certain duration may be configured as the invalid duration. Furthermore, in a case that a certain bit of the bitmap is set to 0, a corresponding OFDM symbol in a certain duration need not be configured as the invalid duration.

In FIG. 15, whether to maintain the phase continuity and/or the power consistency between the actual repetition 15001 and the actual repetition 15002 may be determined based at least on a method of configuring the invalid duration 15011.

For example, in a case that the invalid duration 15011 is configured based at least on the downlink region included in the TDD pattern configuration, the phase continuity and/or the power consistency between the actual repetition 15001 and the actual repetition 15002 need not be maintained.

For example, in a case that the invalid duration 15011 is configured based at least on the domain in which the transmission of the SS/PBCH block is configured, the phase continuity and/or the power consistency between the actual repetition 15001 and the actual repetition 15002 need not be maintained.

For example, in a case that the invalid duration 15011 is configured based at least on the domain in which the monitoring of the Type 0 PDCCH common search space set is configured, the phase continuity and/or the power consistency between the actual repetition 15001 and the actual repetition 15002 need not be maintained.

For example, in a case that the invalid duration 15011 is configured based at least on the domain corresponding to the switching time from the downlink reception to the uplink transmission, the phase continuity and/or the power consistency between the actual repetition 15001 and the actual repetition 15002 need not be maintained.

For example, in a case that the invalid duration 15011 is configured based at least on the domain indicating the invalid duration, the phase continuity and/or the power consistency between the actual repetition 15001 and the actual repetition 15002 may be maintained.

An example applied to the first repetition type may also be applied to the second repetition type.

In a case that each of the plurality of DCI formats schedules the corresponding one of the different PUSCHs, at least the example applied to the first repetition type may be applied.

Various aspects of apparatuses according to an aspect of the present embodiment will be described below.

For example, the fact that the phase continuity between a certain PUSCH instance and a different PUSCH instance is maintained may be defined by that a channel over which a symbol of the certain PUSCH instance on a certain antenna port is conveyed can be inferred from a channel over which another symbol of the different PUSCH instance on the certain antenna port is conveyed. For example, the fact that the phase continuity between a certain PUSCH instance and a different PUSCH instance is not maintained may be defined by that a channel over which a symbol of the certain PUSCH instance on a certain antenna port is conveyed cannot be inferred from a channel over which another symbol of the different PUSCH instance on the certain antenna port is conveyed.

For example, an antenna port may be defined by that, in a certain sub-duration, a channel over which a symbol of a certain PUSCH instance on a certain antenna port is conveyed can be inferred from a channel over which another symbol of the different PUSCH instance on the certain antenna port is conveyed.

For example, the fact that the power consistency between a certain PUSCH instance and a different PUSCH instance is maintained may be that the power of the certain PUSCH instance and the power of the different PUSCH instance are equal. In addition, the fact that the power consistency between a certain PUSCH instance and a different PUSCH instance is maintained may be that reconfiguration of the RF circuitry 12 is not required between the certain PUSCH instance and the different PUSCH instance.

(1) In order to accomplish the object described above, an aspect of the present invention is contrived to provide the following means. That is, a first aspect of the present invention is a terminal apparatus and includes a reception circuitry that receives a DCI format used for scheduling a plurality of PUSCH instances in a certain duration; a determination circuitry that determines a first sub-duration and a second sub-duration based at least on a first resource and based at least on the certain duration; and a transmission circuitry that transmits one or more first PUSCHs in the first sub-duration and transmits one or more second PUSCHs in the second sub-duration. In the first resource, the PUSCH transmission is dropped or canceled, phase continuity is maintained in the one or more first PUSCHs, and the phase continuity is maintained in the one or more second PUSCHs.

(2) In the first aspect of the present invention, the phase continuity is maintained in the one or more first PUSCHs and in the one or more second PUSCHs based at least on the first resource not being determined to be a resource for downlink reception.

(3) A second aspect of the present invention is a base station apparatus and includes a transmission circuitry that transmits a DCI format used for scheduling a plurality of PUSCH instances in a certain duration; a determination circuitry that determines a first sub-duration and a second sub-duration based at least on a first resource and based at least on the certain duration; and a reception circuitry that receives one or more first PUSCHs in the first sub-duration and receives one or more second PUSCHs in the second sub-duration. In the first resource, the PUSCH transmission is dropped or canceled, phase continuity is maintained in the one or more first PUSCHs, and the phase continuity is maintained in the one or more second PUSCHs.

(4) In the second aspect of the present invention, the phase continuity is maintained in the one or more first PUSCHs and in the one or more second PUSCHs based at least on the first resource not being determined to be a resource for downlink reception.

A program running on the base station apparatus 3 and the terminal apparatus 1 according to an aspect of the present invention may be a program (a program that causes a computer to function) that controls a Central Processing Unit (CPU) and the like so as to implement the functions of the above-described embodiment according to an aspect of the present invention. The information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially implemented by a computer. In that case, this configuration may be implemented by recording a program for implementing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as peripheral devices. A "computer-readable recording medium" refers to a portable medium such as a flexible disk, a magneto-optical disk, a ROM, and a CD-ROM, and a storage apparatus such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

Furthermore, the base station apparatus 3 according to the aforementioned embodiment may be implemented as an aggregation (apparatus group) including multiple apparatuses. Each of the apparatuses included in such an apparatus group may include a part or all of each function or each functional block of the base station apparatus 3 according to the aforementioned embodiment. As the apparatus group, it is only necessary to have all of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a NextGen RAN (NG-RAN or NR RAN). Moreover, the base station apparatus 3 according to the aforementioned embodiment may have a part or all of the functions of a higher node for an eNodeB and/or a gNB.

Also, a part or all portions of each of the terminal apparatus 1 and the base station apparatus 3 according to the aforementioned embodiment may be implemented as an LSI, which is typically an integrated circuit, or may be implemented as a chip set. The functional blocks of each of the terminal apparatus 1 and the base station apparatus 3 may be individually implemented as a chip, or a part or all of the functional blocks may be integrated into a chip. Furthermore, a circuit integration technique is not limited to the LSI and may be implemented with a dedicated circuit or a general-purpose processor. Moreover, in a case that a circuit integration technology that substitutes an LSI appears with the advance of the semiconductor technology, it is also possible to use an integrated circuit based on the technology.

In addition, although the aforementioned embodiments have described the terminal apparatus as an example of a communication apparatus, the present invention is not limited to such a terminal apparatus, and is also applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. A configuration in which elements described in the respective embodiments and having mutually the similar effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10, 30 Radio transmission and/or reception circuitry
10*a*, 30*a* Radio transmission circuitry
10*b*, 30*b* Radio reception circuitry
11, 31 Antenna circuitry
12, 32 RF circuitry
13, 33 Baseband circuitry
14, 34 Higher layer processing circuitry
15, 35 Medium access control layer processing circuitry
16, 36 Radio resource control layer processing circuitry
91, 92, 93, 94 Search space set
300 Component carrier
301 Primary cell
302, 303 Secondary cell
3000 Point
3001, 3002 Resource grid
3003, 3004 BWP
3011, 3012, 3013, 3014 Offset
3100, 3200 Common resource block set
9000, 9000*a*, 9000*b* Certain duration
9001, 9002, 9003, 9004, 9005, 11000, 11001, 11002, 11003, 11004, 11005, 11006, 11007, 11008, 11009 PUSCH instance
11011, 11012, 11013, 11014, 11015, 11016, 12001, 13001, 14001, 14002 Duration
15000 Nominal repetition
15001 Actual repetition
15011 Invalid duration
16000 Reference point
16001 Offset

The invention claimed is:

1. A terminal apparatus comprising:

determination circuitry configured to determine a plurality of sub-durations within a duration, a length of which is provided by a higher layer parameter, based on a configuration of a time division duplex (TDD) pattern that is provided to the terminal apparatus; and transmission circuitry configured to maintain power consistency and phase continuity for one or more physical uplink shared channel (PUSCH) instances within each of the plurality of sub-durations, wherein the power consistency and phase continuity are not maintained across the plurality of sub-durations, wherein the determination circuitry is further configured to determine an end point of each of the plurality of sub-durations based on a start point of a downlink region configured by the TDD pattern.

2. A base station apparatus comprising:

higher layer processing circuitry configured to provide, to a terminal apparatus, a higher layer parameter that indicates a length of a duration, which is used for determining a plurality of sub-durations based on a configuration of a time division duplex (TDD) pattern that is provided to the terminal apparatus; and reception circuitry configured to receive one or more physical uplink shared channel (PUSCH) instances while power consistency and phase continuity are maintained within each of the plurality of sub-durations, wherein the power consistency and phase continuity are not maintained across the plurality of sub-durations, wherein an end point of each of the plurality of sub-durations is determined based on a start point of a downlink region configured by the TDD pattern.

3. A communication method performed by a terminal apparatus, the communication method comprising:

determining a plurality of sub-durations within a duration, a length of which is provided by a higher layer parameter, based on a configuration of a time division duplex (TDD) pattern that is provided to the terminal apparatus; and maintaining power consistency and phase continuity for one or more physical uplink shared channel (PUSCH) instances within each of the plurality of sub-durations, wherein the power consistency and phase continuity are not maintained across the plurality of sub-durations, wherein an end point of each of the plurality of sub-durations is determined based on a start point of a downlink region configured by the TDD pattern.

* * * * *